United States Patent [19]

Ueda et al.

[11] Patent Number: 5,379,088

[45] Date of Patent: Jan. 3, 1995

[54] AUTOMATIC FOCUSING CAMERA WITH IMPROVED DETERMINATION OF OPERATION MODES

[75] Inventors: Hiroshi Ueda, Habikino; Hiroshi Ootsuka, Sakai; Tokuji Ishida, Daito; Toshio Norita, Yokohama, all of Japan

[73] Assignee: Minolta Camera Kabushiki Kaisha, Osaka, Japan

[21] Appl. No.: 41,175

[22] Filed: May 17, 1993

Related U.S. Application Data

[62] Division of Ser. No. 615,271, Nov. 19, 1990, Pat. No. 5,218,394.

[30] Foreign Application Priority Data

| Nov. 20, 1989 | [JP] | Japan | 1-301338 |
| Nov. 20, 1989 | [JP] | Japan | 1-301339 |
| Nov. 20, 1989 | [JP] | Japan | 3-301340 |
| Nov. 20, 1989 | [JP] | Japan | 1-301342 |
| Nov. 20, 1989 | [JP] | Japan | 1-310341 |

[51] Int. Cl.⁶ .......................................... G03B 13/36
[52] U.S. Cl. .................................. 354/402; 354/430
[58] Field of Search ................... 354/402, 430, 202

[56] References Cited

U.S. PATENT DOCUMENTS

| 4,709,138 | 11/1987 | Suda et al. | 354/402 |
| 4,719,486 | 1/1988 | Hoshino et al. | 354/408 |
| 4,721,976 | 1/1988 | Aihara et al. | 354/441 |
| 4,774,538 | 9/1988 | Kawai | 354/408 X |
| 4,974,005 | 11/1990 | Izumi et al. | 354/400 |
| 5,005,039 | 4/1991 | Hamada et al. | 354/402 |

FOREIGN PATENT DOCUMENTS

62-186118 11/1987 Japan.

*Primary Examiner*—W. B. Perkey
*Attorney, Agent, or Firm*—Burns, Doane, Swecker & Mathis

[57] ABSTRACT

An automatic focusing camera according to the present invention is an automatic focusing camera having a plurality of operation modes, including an information input device for entering a plurality of types of photographing information, an information analyzer for analyzing the photographing information entered by the information input device based on a fuzzy inference, and a mode determining device for determining one of the operation modes based on the result of the analysis of the information analyzer.

20 Claims, 28 Drawing Sheets

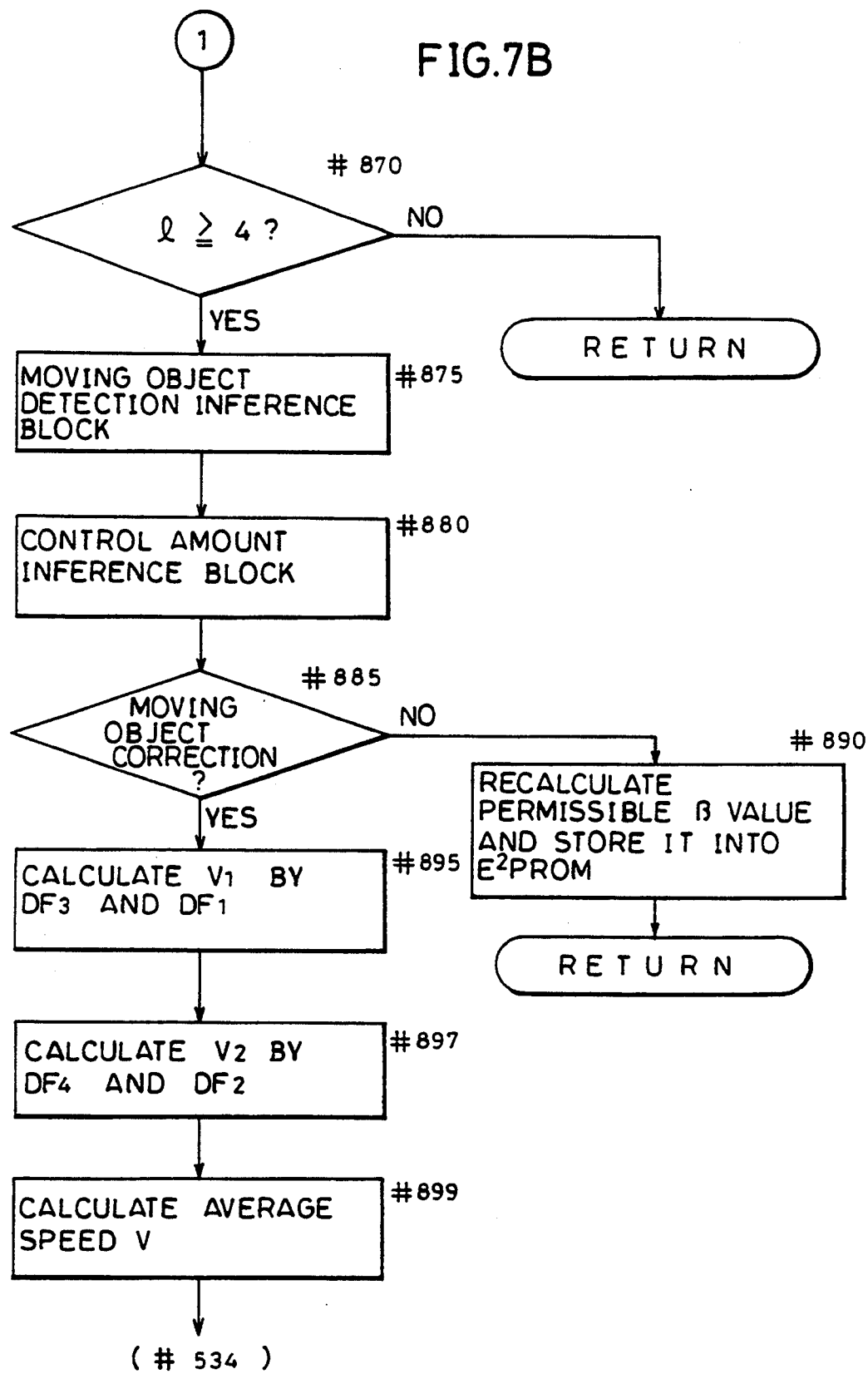

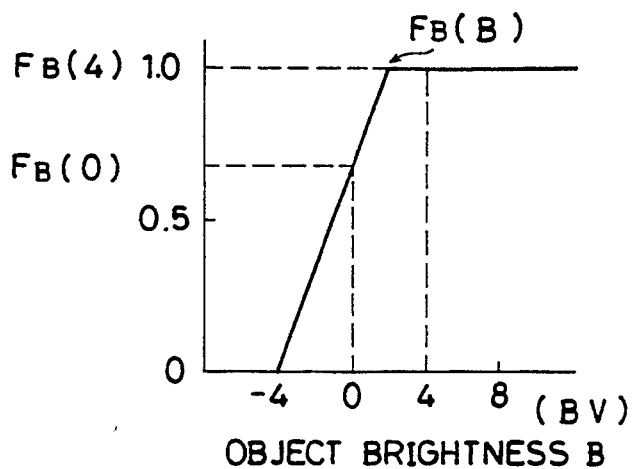
FIG.9A ①
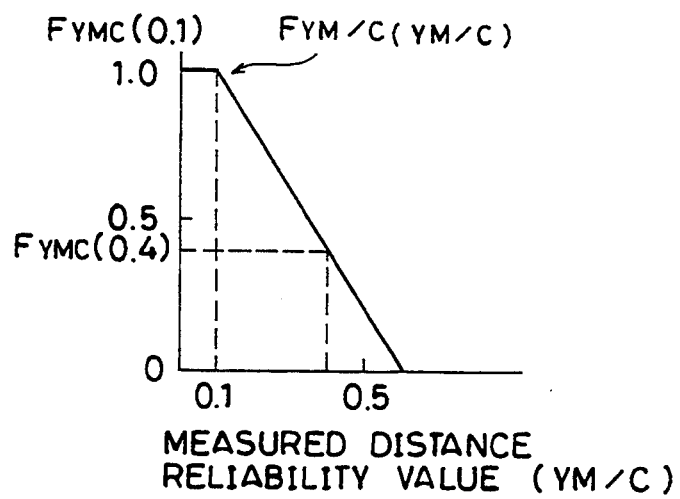
FIG.9B ②
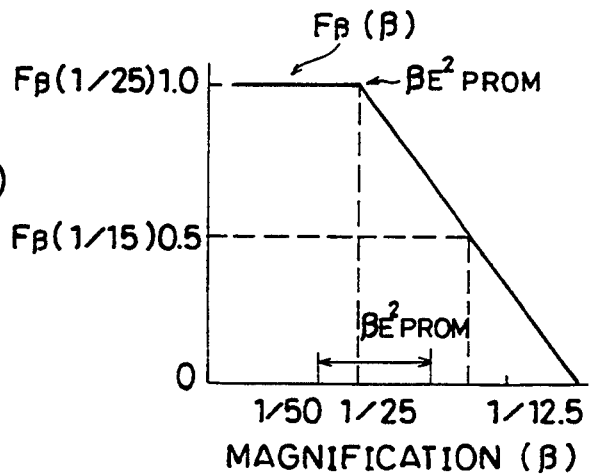
FIG.9C ③

FIG.11

| BRIGHTNESS CHANGE | BACKGROUND | MAIN OBJECT SPEED ON FILM SURFACE — MINUS (MAIN OBJECT BECOMES DISTANT) | | ZERO | PLUS (MAIN OBJECT APPROACHES) | |
|---|---|---|---|---|---|---|
| | | LARGE MINUS VALUE | SMALL MINUS VALUE | 0 | SMALL PLUS VALUE | LARGE PLUS VALUE |
| LARGE | CENTER LARGE | FL ② | FL ② | JC ① | FL ③ | FL ③ |
| LARGE | SMALL | FL ② | FL ② | JC ① | PC ④ | PC ④ |
| SMALL | LARGE | FL ② | FL ② | JC ① | PC ④ | PC ④ |
| SMALL | SMALL | PC ⑤ | C ⑥ | JC ① | PC ④ | PC ④ |

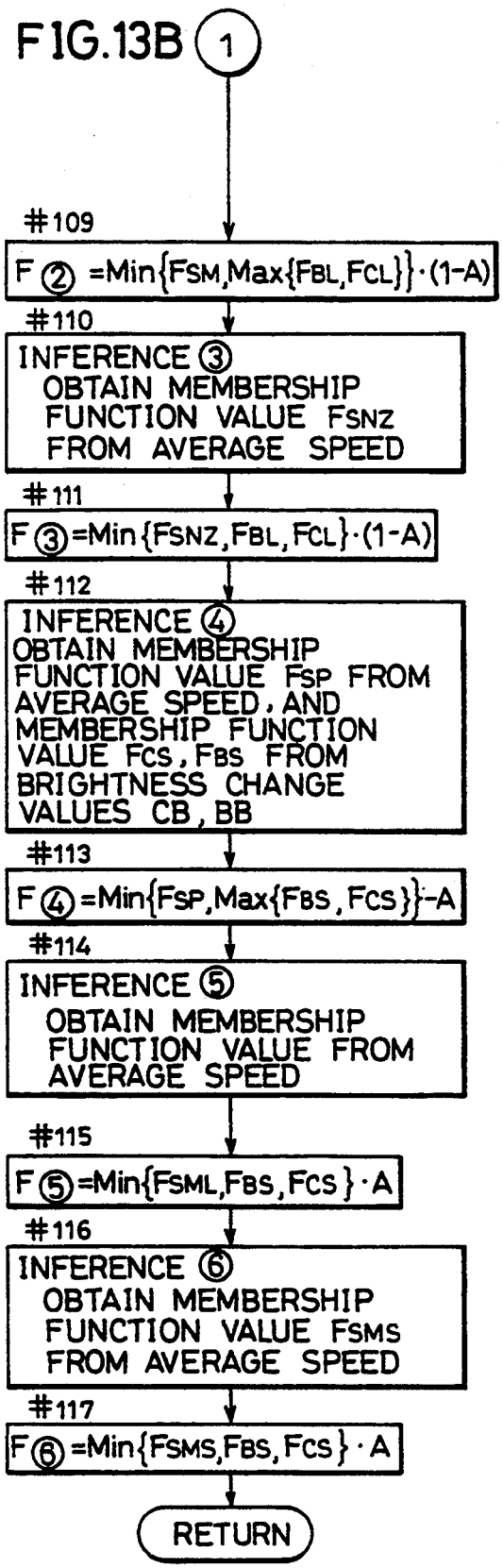

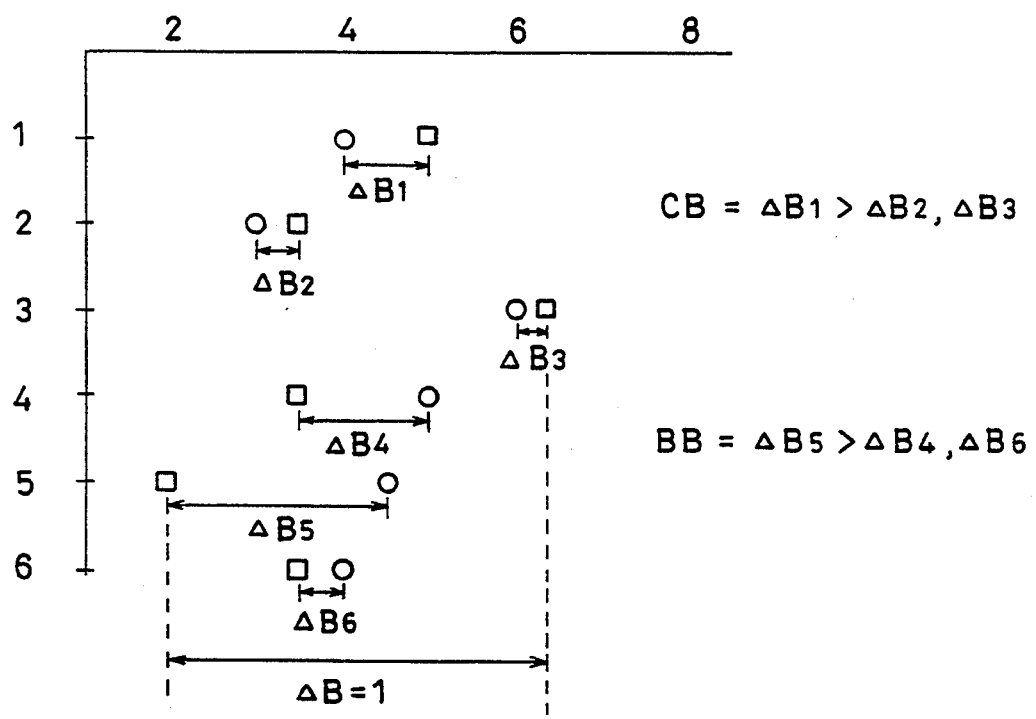

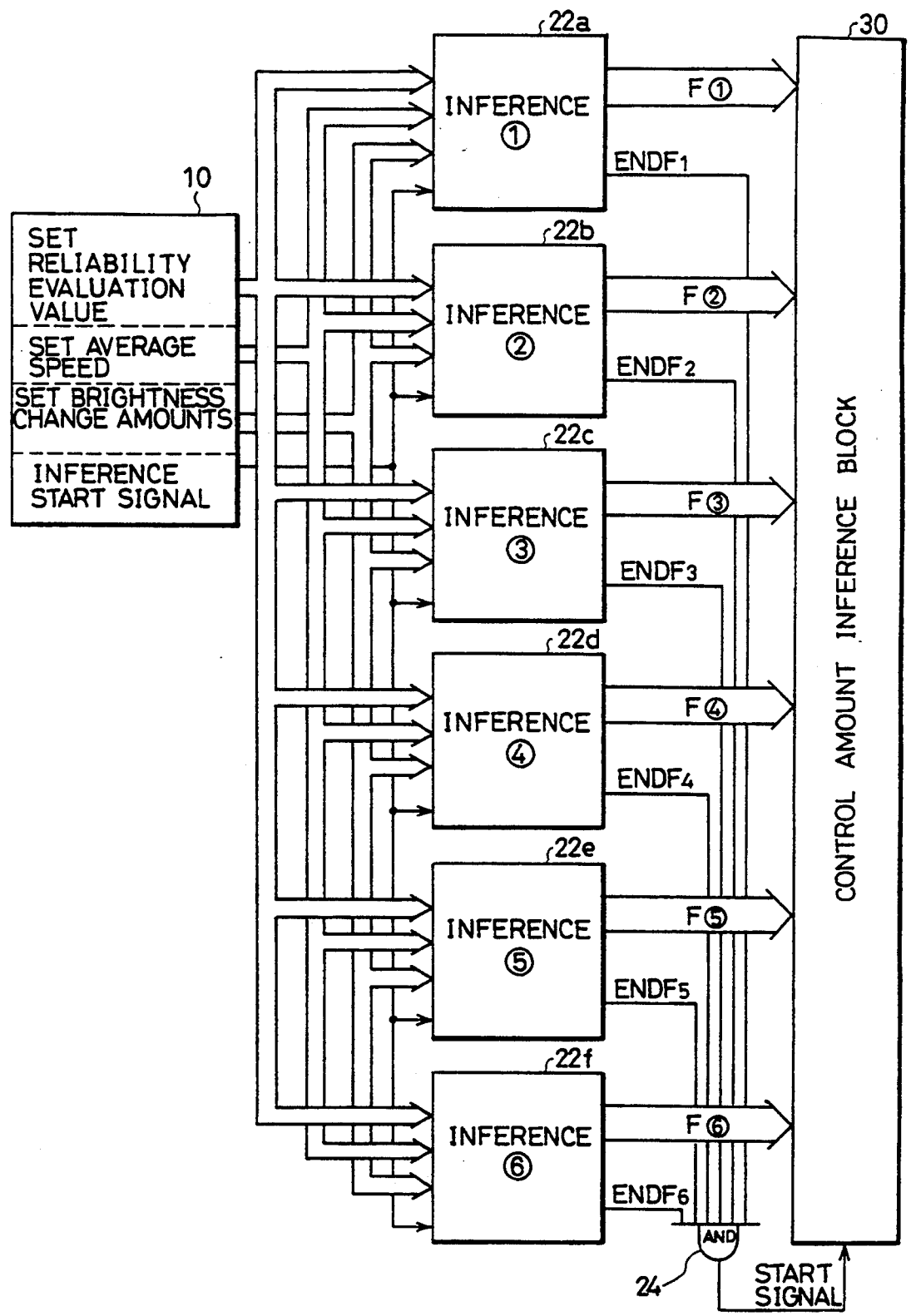

FIG.17A ①
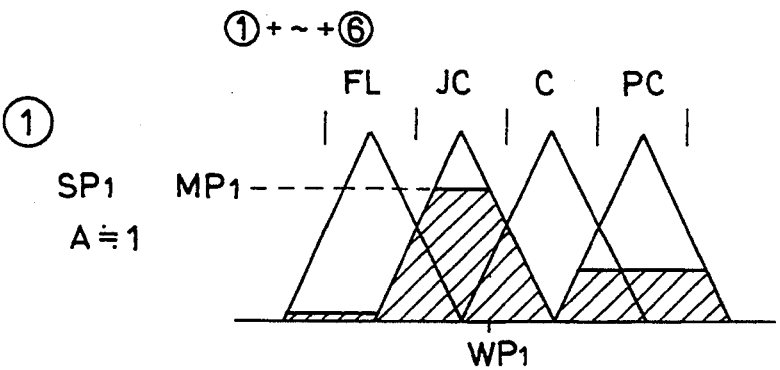
FIG.17B ②
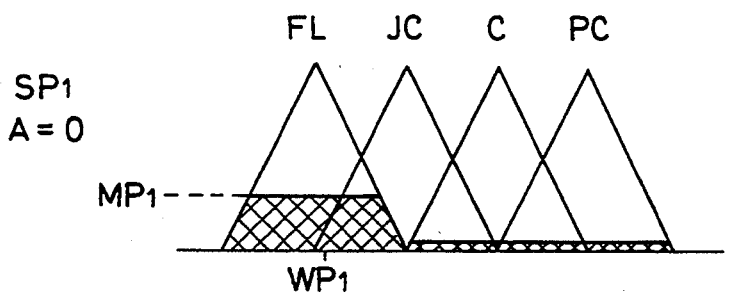
FIG.17C ③
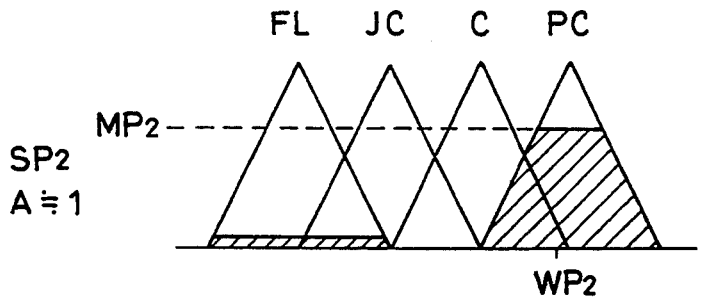
FIG.17D ④
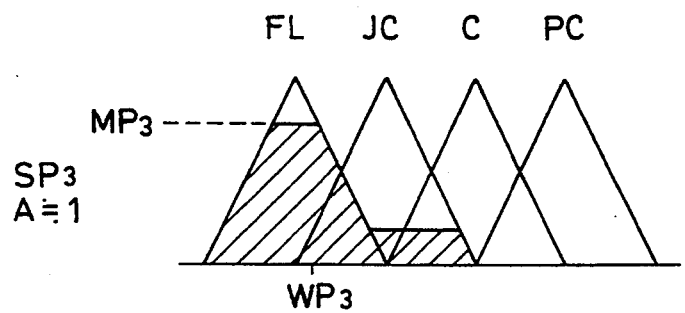

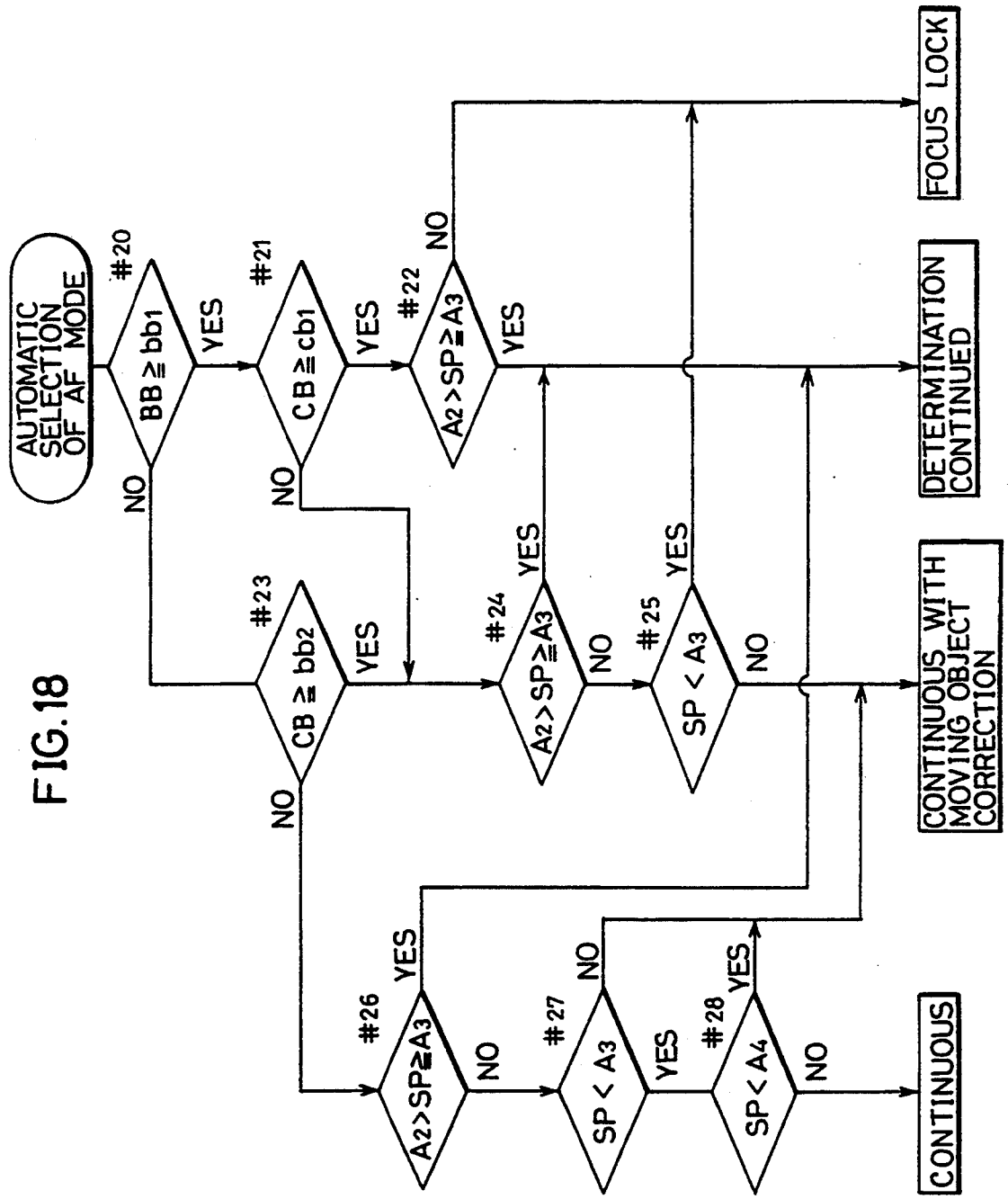

| NO. | BRIGHTNESS CHANGE | | AF MODE |
|---|---|---|---|
| | BACKGROUND | CENTER | |
| 1 | LARGE | LARGE | FOCUS LOCK |
| 2 | LARGE | SMALL | CONTINUOUS |
| 3 | SMALL | LARGE | CONTINUOUS |
| 4 | SMALL | SMALL | CONTINUOUS |

AUTOMATIC FOCUSING CAMERA WITH IMPROVED DETERMINATION OF OPERATION MODES

This application is a division of application Ser. No. 07/615,271, filed Nov. 19,1990, now U.S. Pat. No. 5,218,394.

BACKGROUND OF THE INVENTION

1. Field of the Invention

The present invention relates generally to cameras and particularly to an automatic focusing camera having a function of detracting camera-shake and operating in a plurality of operation modes.

2. Description of the Related

Recently, there have been proposed automatic focusing cameras having various operation modes. Such cameras are controlled by an operation mode most suitable for conditions of an object.

Japanese Patent Laying-Open No. 61-286809 discloses a focusing apparatus which detects a shake amount of an object image and a focal length of a taking lens, compares the shake amount with an image shake permissible value based on the focal length, and controls the therefor drive of a focusing drive lens based on the result of the comparison. This focusing apparatus makes it easy to set an in-focus state by excluding unreliable focus information due to camera-shake and to maintain the in-focus state after the focusing.

In such a conventional camera having the above-mentioned focusing apparatus, even if camera-shake is detected, operation modes are not changed based on the result of the detection. Consequently, the camera is liable to be controlled based on a rather incorrect operation mode dependent on camera-shake.

If an operation mode is to be suitably set by using information on camera-shake, degrees of camera-shake are different dependent on photographers and consequently an appropriate operation mode cannot be set.

An automatic focusing camera using a measured focus detection value indicating a distance to an object as information for switching of operation modes has been proposed.

Such an automatic focusing apparatus intends to easily set an in-focus state by excluding unreliable focus information affected by camera-shake and to maintain the in-focus state.

In such a conventional camera, an operation mode is determined only by the measured focus detection value and if a change in object brightness occurs together with a change in the distance to the object due to panning, it is not possible to determine an appropriate operation mode by suitably detecting such conditions.

Therefore, there have been also proposed cameras having a function of automatically switching operation modes based on various information.

In such a conventional camera having the function of automatic switching of modes, the switching of modes is controlled by crisp determination (binary determination) of various photographing information (such as defocus information, a photographing magnification, and brightness of an object) obtained in a time-sequential manner. Such crisp determination has, however, a limitation in an amount of information to be handled for determination of conditions of the object and it is difficult to reflect sufficient information on switching of operation modes. In addition, if various types of information are combined in order to enhance the precision of switching control, the control becomes complicated and a small change in the information would affect switching of operation modes, making the control unstable.

In addition, in such a conventional camera having the function of automatic switching of operation modes, if a special brightness change as in the case of framing (setting a composition after automatic focusing) occurs, an appropriate operation mode cannot be selected and erroneous operation sometimes occurs.

SUMMARY OF THE INVENTION

An object of the present invention is to improve reliability in an automatic focusing camera.

Another object of the present invention is to determine an appropriate operation mode in an automatic focusing camera.

Still another object of the present invention is to easily determine an appropriate operation mode based on plural types of photographing information in an automatic focusing camera.

In order to accomplish the above-described objects, an automatic focusing camera according to an aspect of the present invention includes an automatic focusing camera having a plurality of operation modes, including: a detector for detecting a degree of camera-shake; a comparator for comparing an output of the detector with a prescribed reference value; and a mode determining device for determining one of the operation modes based on the result of the comparison of the comparator.

The automatic focusing camera structured as described above enables appropriate mode determination since one of the operation modes is determined based on the degree of camera-shake.

In order to accomplish the above-described objects, an automatic focusing camera according to another aspect of the invention includes an automatic focusing camera having a plurality of operation modes, including: an information input device for entering a plurality of types of photographing information; an information analyzer for analyzing the photographing information entered by the information input device based on a fuzzy inference; and a mode determining device for determining one of the operation modes based on the result of analysis of the information analyzer.

The automatic focusing camera structured as described above analyzes the plurality of types of photographing information based on the fuzzy inference to determine one of the operation modes and thus an appropriate operation mode can be determined easily.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 7A and 7B are flow charts of moving object detection corresponding to steps #524 to #532 in FIG. 5.

FIGS. 9A-9F show membership functions representing collating degrees with respect to condition parts of respective inferences used for approximate collation.

FIG. 11 is a diagram showing a relationship between a brightness change and a main object speed on a film surface serving as a basis for the moving object detection inference block in FIG. 8.

FIGS. 13A and 13B are flow charts showing specific procedures of the moving object detection inference block in FIG. 8.

FIG. 15 shows conditions of brightness changes in central and peripheral regions according to the embodiment of the invention.

FIG. 16 is a structural diagram of parallel processing of the moving object detection inference block in FIG. 8, according to another embodiment of the invention.

FIGS. 17A-17D represent diagrams showing procedures for specifically determining operation modes based on respective inference blocks according to the first embodiment of the invention.

FIG. 18 is a flow chart of automatic switching of AF modes according to the second embodiment of the invention.

DESCRIPTION OF THE PREFERRED EMBODIMENTS

Figure 1:
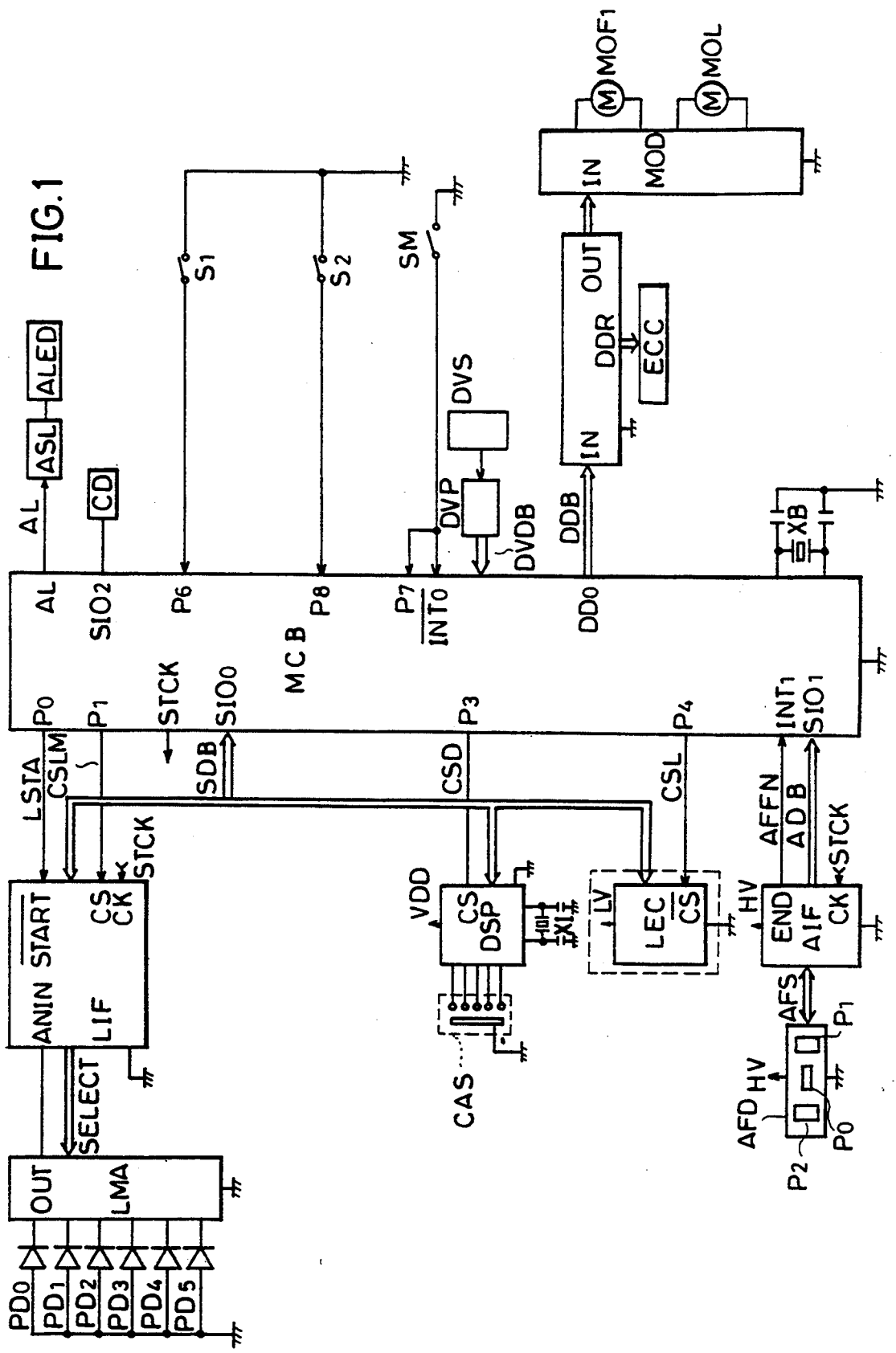
FIG. 1 is a block diagram showing an electric circuit of a camera according to an embodiment of the present invention.

FIG. 1 is a block diagram showing an electric circuit of a camera system according to an embodiment of the present invention.

Referring to FIG. 1, a microcomputer MCB is incorporated in a camera body to control the entire system. The microcomputer MCB is connected with a brightness measuring interface LIF, a display circuit DSP and a lens circuit LEC by means of a serial data bus SDB. The microcomputer MCB is also connected with an automatic focusing (AF) interface AIF through another data bus ADB, and is connected with a drive circuit DDR and a camera-shake detecting circuit DVP through other data buses DDB and DVDB, respectively. In addition, an auxiliary light circuit ASL for focus detection is connected to the microcomputer MOB through a terminal AL. The auxiliary light circuit ASL turns on an auxiliary LED (ALED) in response to a signal AL from the microcomputer MCB. A card interface CD is also connected to the microcomputer MCB through a serial data bus SIO2. The card interface CD receives information from a card containing information of an AF operation mode or the like, and communicates with the microcomputer MCB.

The brightness measuring interface LIF is connected with a brightness measuring circuit LMA, and six photodiodes PD0 to PD5 are connected to the brightness measuring circuit LMA. The photodiodes PD0 to PD5 are located to receive light incident on different areas of a photographing plane.

Figure 2:
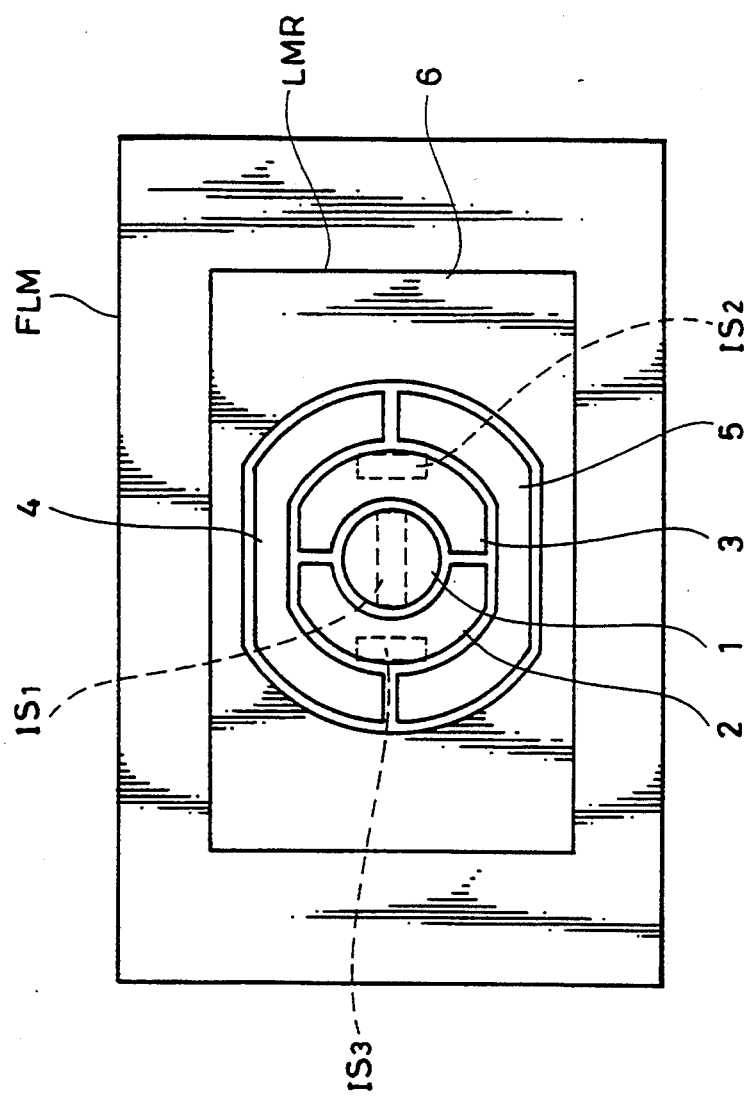
FIG. 2 is a view showing areas of brightness measurement of the photodiodes PD0 to PD5.

FIG. 2 is a diagram showing ranges of brightness measurement of the photodiodes PD0 to PD5.

Referring to FIG. 2, the photodiode PD0 is disposed to receive light incident on a circular area 1 at the center of the photographing plane FLM. The photodiode PD1 is disposed to receive light incident on a C-shaped area 2 on the left of the circular area 1. Similarly, the photodiode PD2 is disposed to receive light incident on a reverse C-shaped area 3 on the right of the circular area 1; the photodiode PD3 is disposed to receive light incident on a C-shaped area 4 located over the circular area 1 in the figure; and the photodiode PD4 is located to receive light incident on a C-shaped area 5 located under the circular area 1 in the figure. The photodiode PD5 is disposed to receive light incident on the remaining area 6 of the rectangular brightness measurement range LMR, excluding the above-mentioned areas.

As can be seen from FIG. 1, the anodes of all photodiodes PD0 to PD5 are grounded in common.

The brightness measuring interface LIF includes an AD converter which converts an analogue output from the brightness measuring circuit LMA to digital data to be supplied to the microcomputer MCB.

The display circuit DSP displays various photographing information (such as an aperture value, a shutter speed, or an exposure control mode), reads the ISO sensitivity of a film from the patrone by means of a contact CAS and transmits it to the microcomputer MCB. The display circuit DSP has its own control microcomputer, and a reference clock generating circuit X1 is connected thereto.

The lens circuit LEC is provided in each taking lens and it supplies information of the taking lens concerned (such as a focal length, a full open aperture value etc.).

A control signal is supplied to the AF interface AIF from the microcomputer MCB through the data bus ADB. The AF interface AIF controls, in response to the control signal, the operation of the focus detection light receiving circuit AFD including CCD line sensors through a signal line AFS. In addition, the AF interface AIF receives analogue data of each pixel of the CCD line sensors through the line AFS and converts the data to digital data, which is supplied to the microcomputer MCB through the data bus ADB. The focus detection light receiving circuit AFD has three CCD line sensors P0, P1 and P2, which are used to detect an in-focus state of an object located in the ranges shown by the broken lines in FIG. 2. More specifically, the CCD line sensor P0 is used to detect an in-focus state of the object in the horizontal direction located at the center of the photographing plane FLM (in the 0th zone). The CCD line sensor P1 is used to detect an in-focus state of the object in the vertical direction located a little rightward (in the first zone) from the center. The CCD line sensor P2 is used to detect an in-focus state of the object in the vertical direction located a little leftward (in the second zone) from the center. When accumulation by CCDs in the three CCD line sensors P0, P1 and P2 is completed, the AF interface AIF provides an accumulation completion signal of AFFN of low (L) level and supplies an interruption signal to the microcomputer MCB through a terminal INT1.

The camera-shake detecting circuit DVP receives a control signal through the data bus DVDB from the microcomputer MCB at timing of turn-on of a main switch, whereby it starts operation. As already stated in Japanese Patent Laying-Open No. 61-286809 etc., the camera-shake detecting circuit DVP controls the operation of a camera-shake detecting block DVS formed by combination of a plurality of acceleration detecting devices or angular velocity detecting devices in response to the control signal, whereby the output therefrom is obtained. The output of the camera-shake detecting block DVS is converted to digital data by the camera-shake detecting circuit DVP, and information on the direction and frequency of the shake as well as the degree thereof is supplied to the microcomputer MCB through the data bus DVDB. The microcomputer MCB uses such information on the shake as a factor for operation determination in AF operation to be described afterwards, and drives a camera-shake correction motor incorporated in a lens, not shown, to correct the camera-shake with respect to the camera-shake information in release operation.

Next, description will be made of switches.

A brightness measuring switch S1 is turned on when an release button, not shown, is depressed at the first stroke. As a result of the turn-on of the switch S1, the microcomputer MCB starts measurement of brightness and detection of an in-focus state.

A release switch S2 is turned on when the release button is depressed at the second stroke longer than the first stroke. Thus, if the release switch S2 is on, the brightness measuring switch S1 is always on. By the turn-on of the switch S2, the microcomputer MCB starts exposure control operation.

When the main switch SM is on or off, a processing flow of "SM ON" to be described afterwards is executed.

Though not shown, terminals of those switches on the non-ground side are pulled up to a power supply voltage VDD through a pull-up resistor and, needless to say, means for protection against chattering is provided.

Control data is supplied to the drive circuit DDR from the microcomputer MCB through the data bus DDB. The control data is decoded, whereby exposure in an exposure control circuit ECC is controlled and motor control data is supplied to a motor control circuit MOD.

The motor control circuit MOD controls forward and reverse rotations of a film feed motor MOFI and a lens drive motor MOL, and controls the stop thereof.

A reference clock generating circuit XB is formed by a quartz oscillator and a capacitor. A reference clock pulse STCK supplied through a reference clock output terminal STCK of the microcomputer MCB is supplied to the brightness measuring interface LIF and the AF interface AIF.

Figure 3:
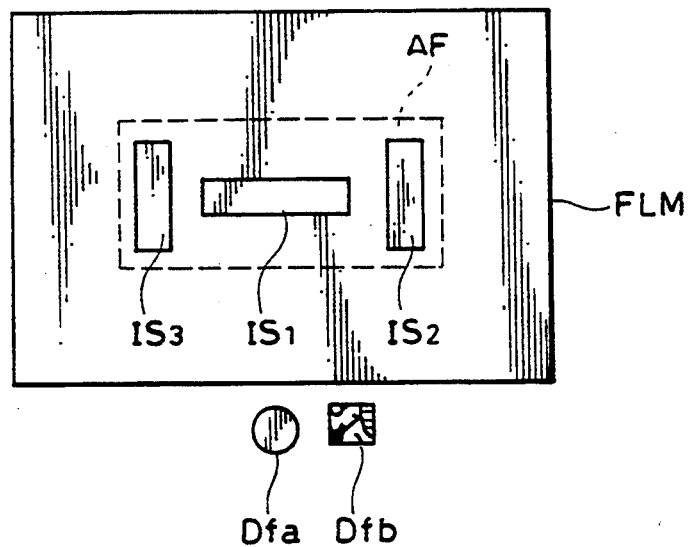
FIG. 3 is a view of a visual field in a finder according to the embodiment of the invention.

FIG. 3 is a view of a visual field in a finder according to an embodiment of the invention.

Referring to FIG. 3, correspondence between the finder and focus detection areas will be described. The first CCD line sensor P0 corresponds to the focus detection area IS1 on the optical axis; the second CCD line sensor P01 corresponds to the right focus detection area IS2 outside the optical axis; and the third CCD line sensor PO2 corresponds to the left focus detection area IS3 of the optical axis. Thus, focus detection can be effected with respect to the object located in the three focus detection areas IS1, IS2 and IS3 (hereinafter referred as the first island IS1, the second island IS2 and the third island IS3 if it is necessary to distinguish among them) shown by the solid lines in the central region of the photographing plane FLM. A rectangular frame AF shown by the dotted lines in the figure is displayed to notify the photographer of a photographing area where focus detection is effected. A display portion Dfa shown outside the photographing plane FLM indicates a focus detection condition. It is illuminated in green in the in-focus state and it is illuminated in red in a state where focus detection is unavailable. A display portion Dfb is a liquid crystal display for displaying a moving object detection mode.

Figure 4:
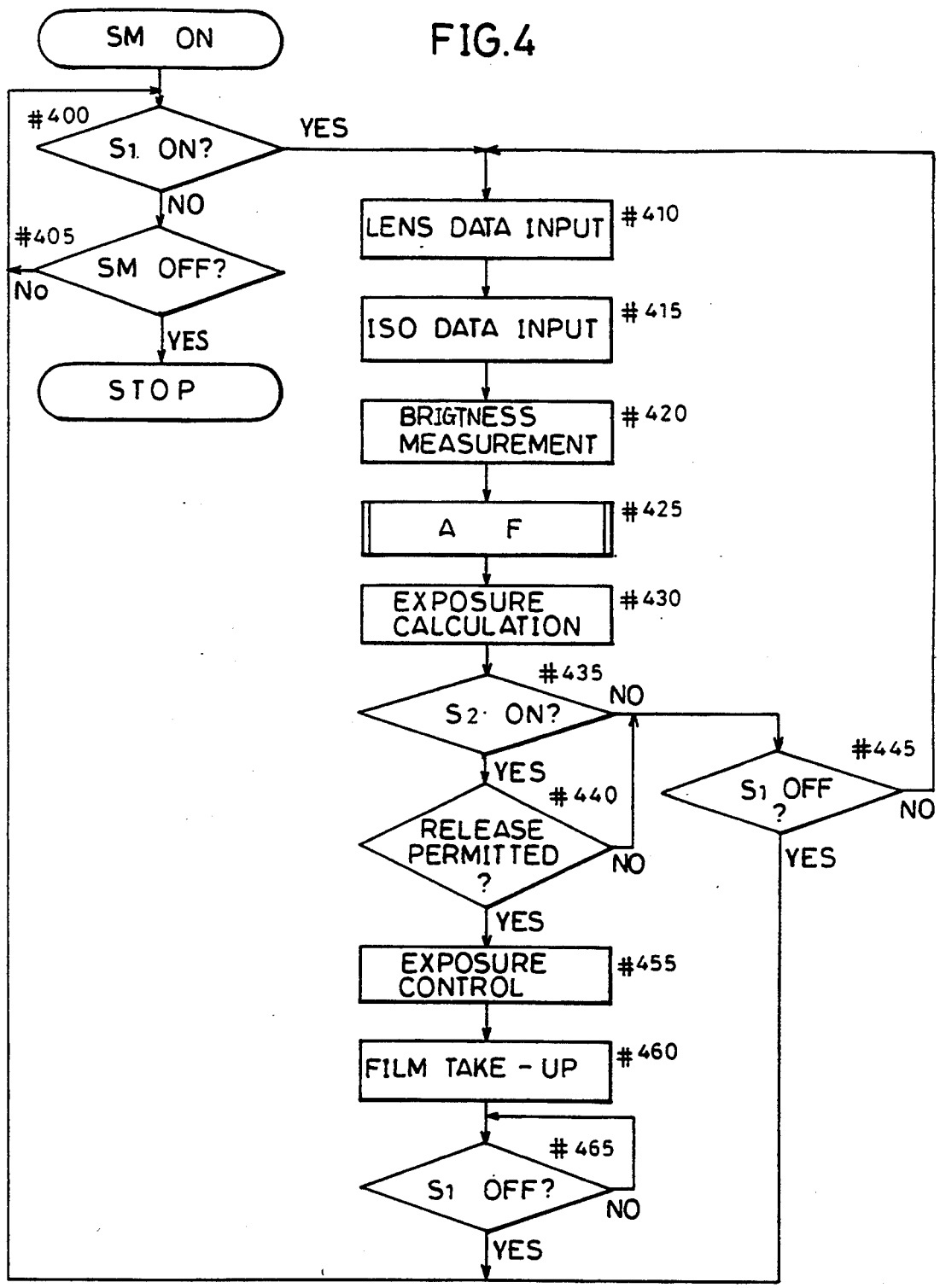
FIG. 4 is a flow chart showing an operation sequence of a camera according to the embodiment of the invention.

Next, an operation sequence of the camera, mainly AF operation will be described with reference to the flow chart of FIG. 4.

When the main switch SM is turned on, the processing flow starts. First in step #400, it is determined whether the brightness measuring switch S1 is closed or not. A loop of steps #400 and #405 is executed until the brightness measuring switch S1 is closed. In step #405, it is determined whether the main switch SM is opened or not. If the main switch SM is opened, the microcomputer MCB proceeds to a stop mode.

If it is determined in step #400 that the brightness measuring switch S1 is closed, specific lens data of the taking lens is entered from the lens circuit LEC in step #410. The lens data includes focal length data f, a coefficient $K_O$ of conversion between a defocus amount and a lens drive amount, a full open F value ($A_V$ value) $A_{V0}$ of the taking lens, etc.

In step #415, set data $S_V$ of ISO of the film is entered through a film sensitivity reading circuit and brightness measuring operation is performed in step #420, so that measured brightness data $B_V$ is entered through the brightness measuring interface LIF. In step #425, a subroutine AF for AF operation is called. This subroutine will be described in detail afterwards. In step #430, exposure calculation is performed, so that a shutter speed $T_V$ and an aperture value $A_V$ for exposure control are calculated.

Next, in step #435, it is determined whether the release switch S2 is closed or not. If the switch S2 is closed, it is determined in step #440 whether release operation is permitted or not, referring to a release permission flag to be described afterwards. If release operation is permitted, the program proceeds to step #455 to perform exposure control.

If it is determined in step #435 that the release switch S2 is not closed, and if it is determined in step #440 that release operation is not permitted, it is determined in step #445 whether the brightness measuring switch S1 is opened or not. If it is opened, the program proceeds to step #400. If it is closed, the program proceeds to the next brightness measurement • AF routine beginning with step #410.

In step #455, exposure control is performed based on the shutter speed $T_V$ and the aperture value $A_V$ obtained in step #430.

Figure 5A:
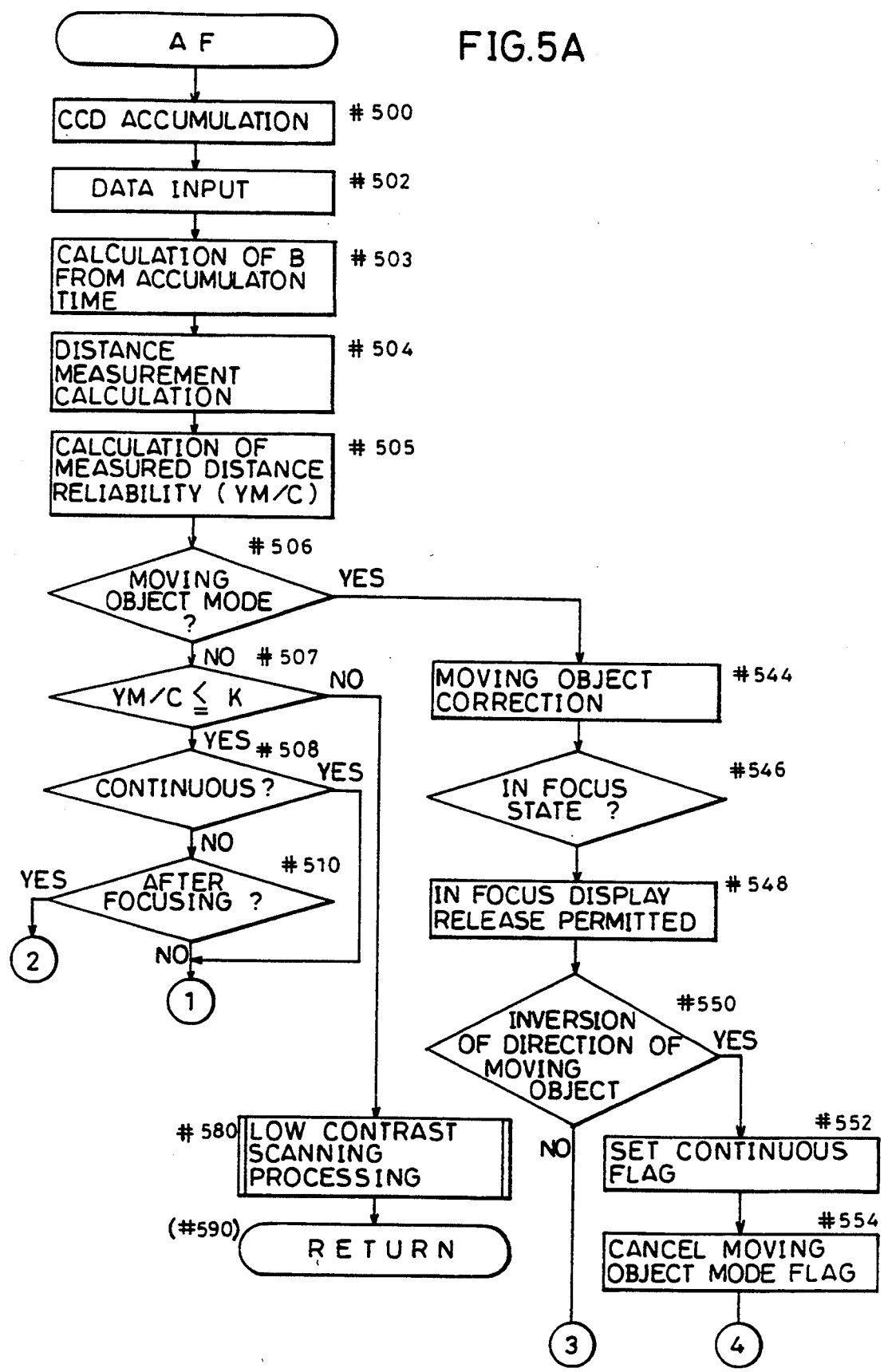
FIGS. 5A and 5B are schematic flow charts of an AF subroutine in step #425 in FIG. 4.
Figure 5B:
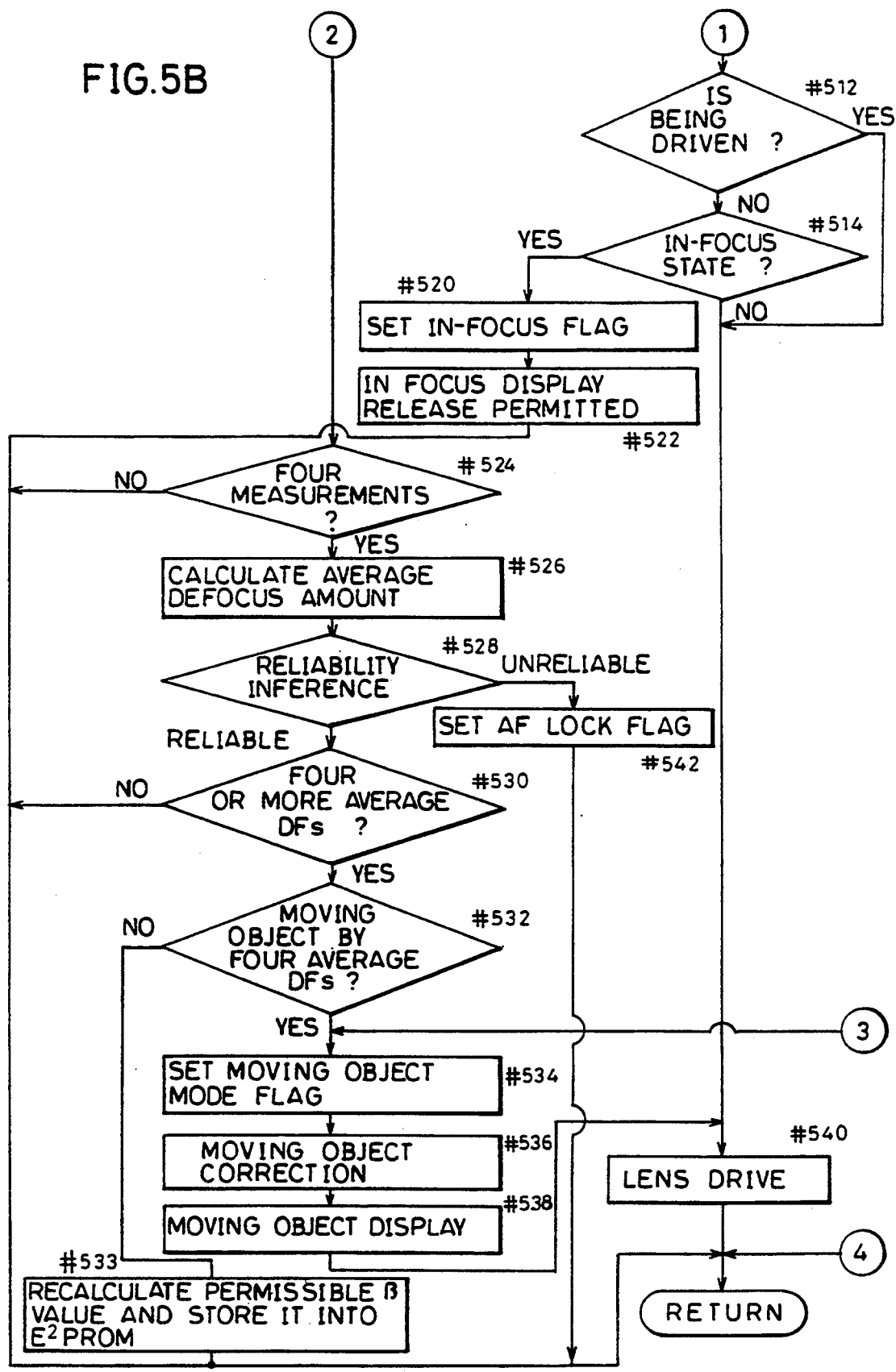

FIGS. 5A and 5B are schematic flow charts of the AF subroutine called in step #425.

When this subroutine is called, accumulation by the CCDs is performed in the focus detection light receiving circuit AFD in step #500, and in step #502, pixel data obtained is converted to digital data, which is supplied to the microcomputer MCB. In step #502, accumulation time in the accumulation by the CCDs is input, and in step #503, brightness B of the object of AF is calculated from the accumulation time. The brightness B of the object of AF is used in a moving object reliability inference to be described afterwards. In step #504, a defocus amount is obtained by using the input pixel data. In step #505, a reliability value YM/C of a measured focus detection value is calculated. The reliability value YM/C of the measured focus detection is described in detail in Japanese Patent Laying-Open No. 59-126517 and Japanese Patent Laying-Open No. 60-4914.

In step #506, determination as to the moving object mode is effected. This determination will be described afterwards. When it is determined that the object is a moving object, a moving object mode flag is set. Thus, in the subsequent loop, the processing flow branches to moving object processing in step #544 et seq. if the object is a moving object, based on determination of the above-mentioned flag. Consequently, since it is not possible to determine whether the object is a moving object or not in focus detection in the first loop, the processing flow always proceeds to step #507.

The reliability value YM/C of the measured distance obtained in step #505 is compared with a prescribed value K. If the reliability value YM/C is larger than the prescribed value K, the measured focus detection value obtained in step #504 is unreliable and therefore the program proceeds to low contrast scanning processing in step #580. The low contrast scanning processing is processed for repeating measurement of distance while driving the lens in a forced manner to find out a lens position making it possible to obtain a reliable measured value. Since the low contrast scanning processing does not have a direct relation with the present invention, the description thereof is not given in this specification.

If the measured focus detection reliability value YM/C is smaller than the prescribed value K, this means that the measured focus detection value obtained in step #504 is relatively reliable and therefore the program proceeds to step #508.

In step #508, it is determined whether continuous AF is selected or not. If the continuous AF is selected, the continuous AF operation is performed based on a continuous flag set after setting of a continuous AF flag to be described later.

Then, in step #510, it is determined by using an in-focus flag to be described later whether an in-focus state is set or not. Thus, after the in-focus state is set, the processing flow branches to the moving object determination beginning with step #524. If the in-focus state has not been set, it is determined in step #512 whether the lens is being driven or not. If the lens is being driven, step #514 is skipped because in-focus determination in the subsequent step would not be made with a good precision. If the lens is not being driven, it is determined in step #514 whether the taking lens enters an in-focus zone. If it is in the in-focus zone, the in-focus flag (which is used in step #510) is set in step #520 and the in-focus display (green display of the portion Dfa shown in FIG. 3) is turned on in step #522 and the release permission flag (which is used in step #440 in FIG.4) is set.

If it is determined in step #514 that the taking lens is not in the in-focus zone, lens drive for focusing is performed in step #540 and the program returns to the main routine, so that the next focus detection measurement beginning with step #500 is started.

If it is determined in step #510 that the in-focus flag is set, the program proceeds to step #524 to determine whether focus detection is performed four times. If focus detection measurement is not performed consecutively four times, the program returns to the main routine to start the next focus detection in step #500 et seq.

If four focus detections are terminated, four defocus amounts obtained by the four focus detections are averaged in step #526 so that an average defocus amount $DF_X$ is obtained. Then, in step #528, a reliability inference is made based on data of previously obtained two or more average defocus amounts, and variation in the brightness of the object, the measured focus detection reliability value, the photographing magnification and the moving speed of the object. If the reliability of determination in the AF operation mode is very low, the program proceeds to step #542 to set the AF lock flag. In the first loop, there is not a necessary number of data and accordingly the same value is used.

If a fairly good reliability is inferred in step #528, it is determined in step #530 whether four or more average defocus amounts $DF_X$ mentioned above are obtained or not. This is because the next moving object determination in step #532 is effected only when four average defocus amounts $DF_X$ are obtained. If there are not four average defocus amounts $DF_X$, the program also returns to the main routine to start the next loop of focus detection beginning with step #500 et seq.

If there are four average defocus amounts $DF_X$, the moving object determination is effected in step #532 using the four average defocus amounts $DF_X$.

If it is determined in step #532 that the object is not a moving object, the permissible magnification value $\beta$ is recalculated and the obtained value is written into the $E^2PROM$ (in step #533). Then, the program returns to the main routine.

If it is determined in step #532 that the object is a moving object, the moving object mode flag (which is used in step #506) is set in step #534, and calculation for moving object correction is performed in step #536. Thus, a lens drive amount is obtained by calculating an estimated amount of defocus due to the moving object, in addition to a normal defocus amount.

After that, a moving object display (the display of LCD (Dfb) shown in FIG. 3) is turned on in step #538 and the lens is driven in step #540 based on the calculated lens drive amount. In the following, the operation mode of the above-mentioned moving object correction and lens drive is referred to as the "moving object mode".

After the "moving object mode" is started, the program returns to the main routine after lens drive to enter again the loop beginning with step #500. The program proceeds this time from step #506 to step #544 to perform calculation for moving object correction. The calculation for moving object correction in step #544 is different from the calculation for moving object correction for lens drive in step #536. In step #536, correction is made for the purpose of correcting the value at termination of the subsequent focus detection, while in step #544, correction is made for the purpose of correcting the value at termination of the present focus detection.

In step #546, in-focus determination is made based on a value obtained by the correction. If the in-focus state is determined, in-focus display is made and release operation is permitted in step #548. Subsequently, in step #550, it is determined whether the moving direction of the object is inverted during the "moving object mode". If the moving direction is inverted, a continuous flag is set in step #552 to select a "continuous mode", and the moving object mode flag is canceled in step #554.

This is because if moving object correction is made in spite of the inversion of the moving direction of the object, correction would be sometimes made reversely with respect to forward or rearward movement of the object. Such phenomenon occurs because of a delay in the moving object correction due to a time lag caused by the accumulation time of the CCD line sensors in the case of detecting the movement of the object. Therefore, the simple continuous AF exhibits a better tracking effect with respect to an object moving forward and rearward at random.

Figure 6:
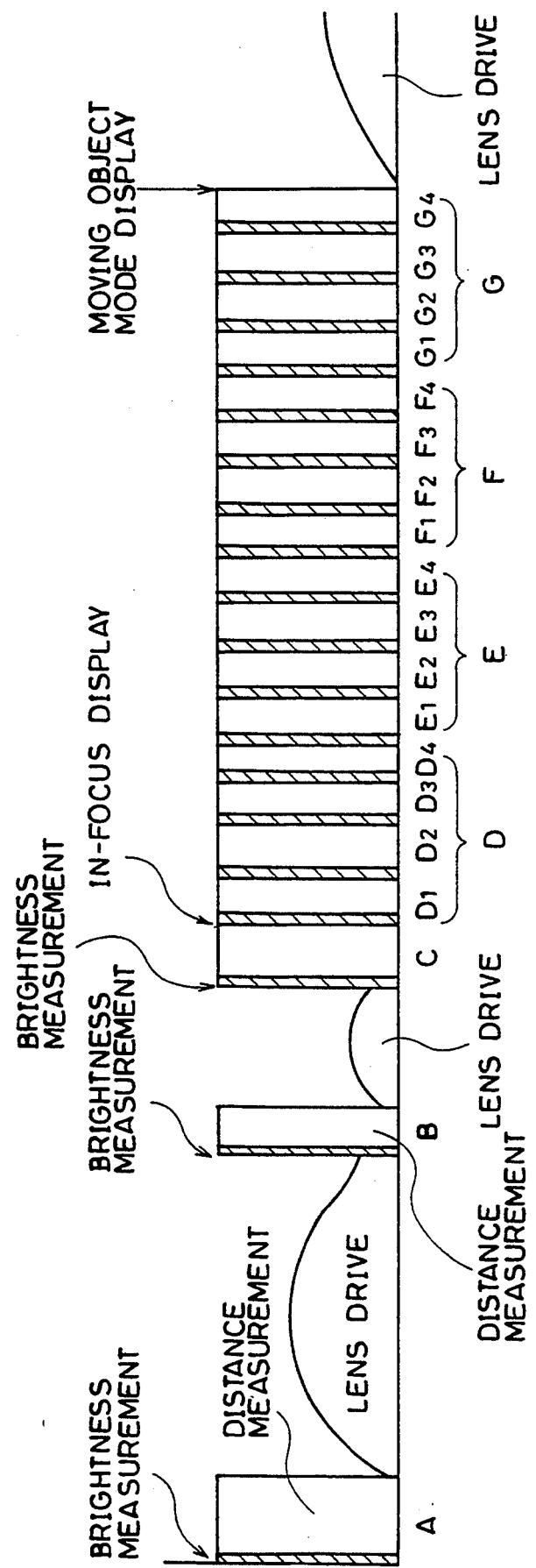
FIG. 6 is a sequence diagram of moving object determination according to the embodiment of the invention.

FIG. 6 is a sequence diagram of moving object determination.

Referring to FIG. 6, the lens is driven in the first and second focus detections A and B and detection of a moving object is started after focus detection C for determination of the in-focus state. The reason that moving object detection is not effected in the focus detections A and B is that the object in most cases is not in the in-focus zone yet in the focus detection B because of a backlash of the lens drive, a low precision of focus detection due to a large deviation of the lens from the in-focus position, and an error in the coefficient $K_O$ of conversion between the defocus amount and the lens drive amount.

In the moving object detection, after the in-focus state is determined by the focus detection C, focus detection is effected four times consecutively while the taking lens is stopped. As shown in FIG. 6, the four focus detections $D_1$, $D_2$, $D_3$, and $D_4$ are effected consecutively. The defocus amounts obtained by those focus detections are averaged so that an average defocus amount $DF_X$ is obtained. Subsequently, four focus detections are repeated. Thus, when the average defocus amount $DF_X$ is obtained in each of the sequences of four focus detections including $E_1$–$E_4$, $F_1$–$F_4$ and $G_1$–$G_4$, moving object determination is effected by using those four average defocus amounts $DF_X$. The speed of the object which can be detected in this moving object determination is a speed higher than 0.25 mm/s obtained by conversion on the film surface. If it is determined that the object is a moving object, the operation mode switches to the "moving object mode", in which moving object correction and moving object display are effected.

Figure 7A:
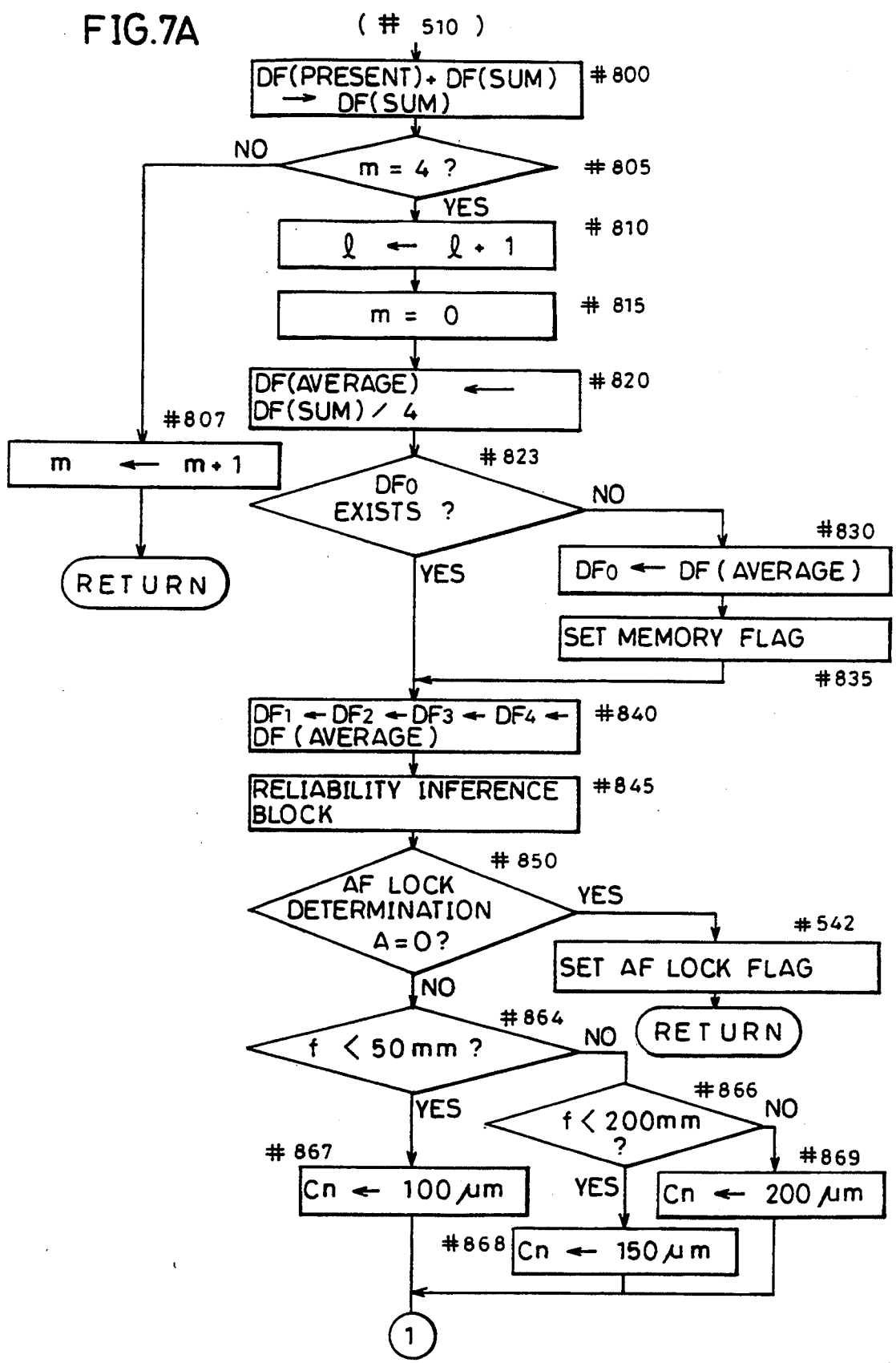

FIGS. 7A and 7B are specific flow charts of moving object detection.

Those flow charts correspond to steps #524 to #532 in FIG. 5.

Referring to the figures, it is assumed that data stored in a memory as DF (sum) which is a sum of defocus amounts DF is cleared by closing the brightness measuring switch S1. Then, as a result of the determination in step #510 in FIG. 5, the flow after the in-focus determination starts as shown.

In step #800, a defocus amount (present) obtained by the present focus detection is added to the data DF (sum) stored in the memory and the value obtained by the addition is stored as DF (sum). In step #805, it is determined whether consecutive four focus detections have been made. If the four focus detections have not been made, the program proceeds to step #807, where a first determination counter m counts upward. Then the program returns to the main routine.

If the four focus detections have been made, a second determination counter l which determines the number of occurrences of the sequence of four consecutive focus detections is caused to count upward in step #810. Those two counters l and m are cleared when the brightness measuring switch S1 is closed. In step #815, only the first determination counter n is cleared.

In step #820, the sum DF of four defocus amounts is divided by 4 so that an average defocus amount DF (average) is obtained. In step #825, it is determined by using a memory flag to be described afterwards whether the first value $DF_O$ of such average defocus amount DF (average) after the setting of the in-focus state (this value being referred to as the "base defocus amount"). If the base defocus amount $DF_O$ is in the memory, the program proceeds to step #840. If it is not stored in the memory, the first average defocus amount DF (average) is set as the base defocus amount $DF_O$ in step #830 and the memory flag (which is the same as used in step #825) is set in step #835.

In step #840, the average defocus amount DF (average) obtained in step #820 is stored in a memory $DF_4$ and data in four memories $DF_4$, $DF_3$, $DF_2$ and $DF_1$ are successively sifted. Thus, the latest average defocus amount DF (average) is always in the memory $DF_4$. In steps #845 and #850, determination is made to set AF lock. The reliability inference block in those steps will be described afterwards with reference to FIGS. 8, 10A and 10B. If a reliability inference value A is such a low value as 0 (YES in step #850), the AF lock flag is set in step #542 and the program returns to the main routine. In the other cases, the focal length of the taking lens is determined in steps #864 and #866 and a moving object determination level to be used in step #875 is appropriately set. If the focal length f is determined to be smaller than 50 mm in step #864, the determination level Cn is set to 100 $\mu$m in step #867. If the focal length is determined to be smaller than 200 mm in step #866, the determination level Cn is set to 150 $\mu$m in step #868. If the focal length f is determined to be larger than 200 mm, the determination level Cn is set to 200 $\mu$m in step #869. This determination level Cn is used to determine the difference between the two values of the average defocus amounts DF (average).

In step #870, it is determined what is the number of sequences of four consecutive focus detections, that is, whether or not the number of average defocus amounts DF (average) obtained for each sequence of four consecutive focus detections is 4. If it is 4 or more, the moving object determination beginning with step #875 is effected.

This moving object determination includes two large inference blocks. One is a moving object detection inference block (in step #875) and the other is a control amount inference block (in step #880). Details of those blocks will be described afterwards with reference to the flow charts of FIGS. 11, 12 and 13.

In step #885, it is determined whether moving object correction is to be made or not. If moving object correction is not to be made, the permissible magnification value $\beta$ is recalculated and the value obtained is written in the memory E²PROM (in step #890), and the program returns to the main routine. If moving object correction is to be made, an object speed $V_1$ is calculated by using two average defocus amounts $DF_3$ and $DF_1$ and the time between the two measurements in step #895. Similarly in step #897, an object speed $V_2$ is calculated by using two average defocus amounts $DF_4$ and $DF_2$ and time between the two measurements. In step #899, the average of those object speeds $V_1$ and $V_2$ is calculated ($V=(V_1+V_2)/2$), whereby an average object speed V is obtained. Then, the program proceeds to step #534 in FIG. 5.

In the moving object correction, a defocus amount at the end of the next focus detection is estimated by using the average object speed V and a lens drive amount taking account of the estimated defocus amount is obtained, whereby focusing operation is repeated. When an in-focus state is set, release operation is performed. In the release operation, the release switch S2 may be closed after the setting of the in-focus state, or the release switch S2 may be closed before the setting of the in-focus state. When the release switch S2 is closed, exposure control is performed. The camera system has a structure where light does not enter a focus detection optical system AO during the exposure control.

The control procedure for the moving object correction or the like is the same as that described in U.S. Ser. No. 352,190 filed by the same assignee as that of the present application and therefore the description is not repeated.

Next, description will be made of determination and inference of AF operation using a fuzzy inference constituting a main feature of the embodiment of the present invention.

Figure 8:
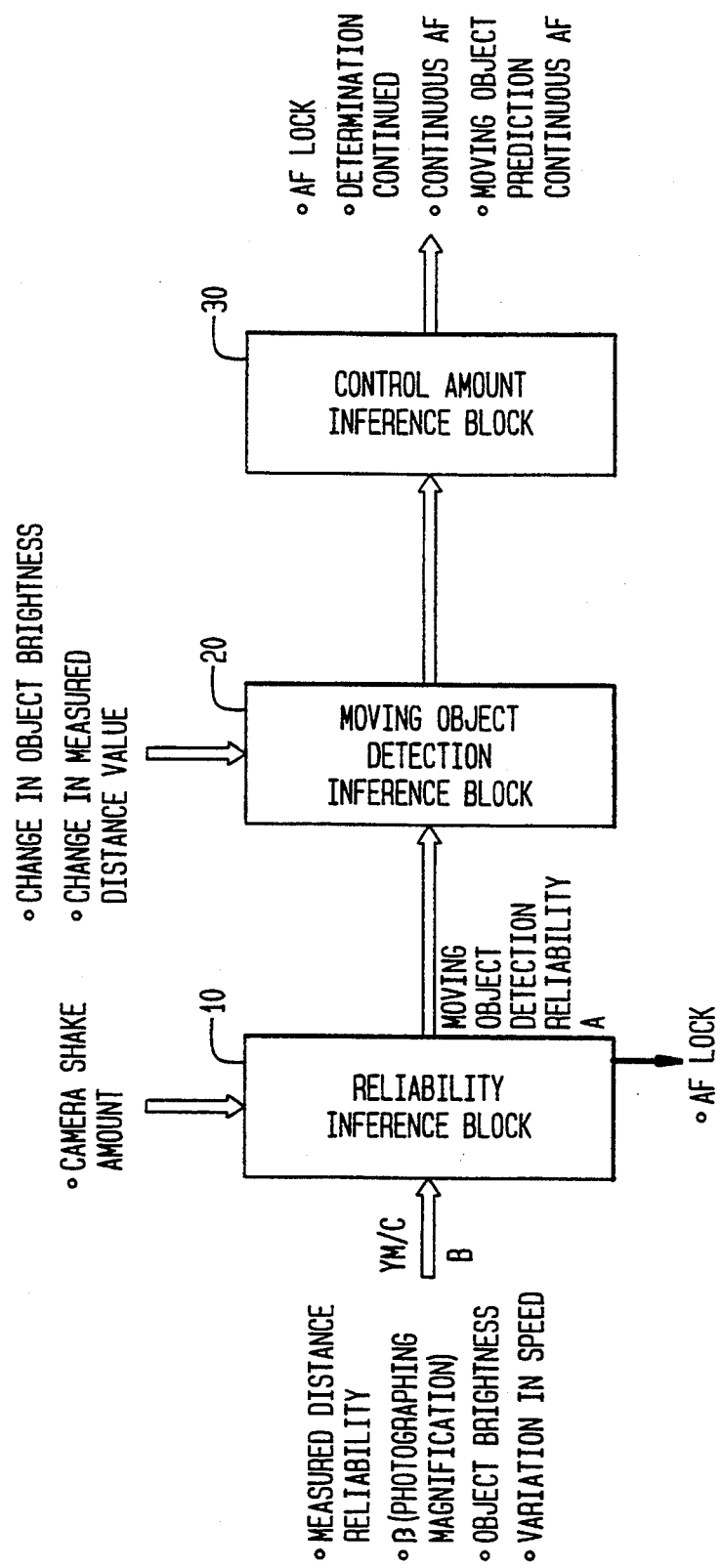
FIG. 8 is a schematic diagram of an inference block according to the embodiment of the invention.
Figure 9D:
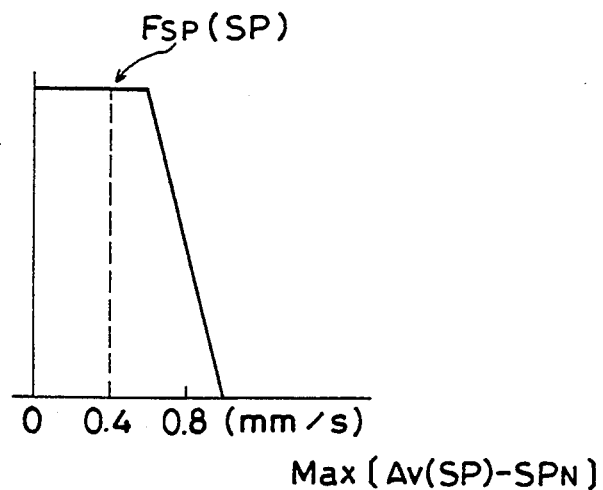
Figure 9E:
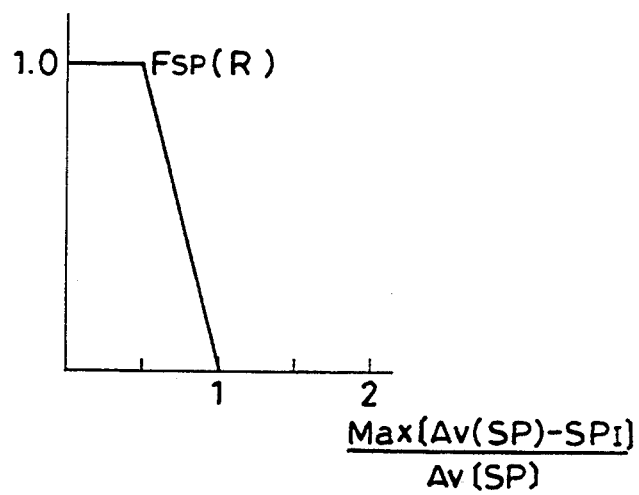
Figure 9F:
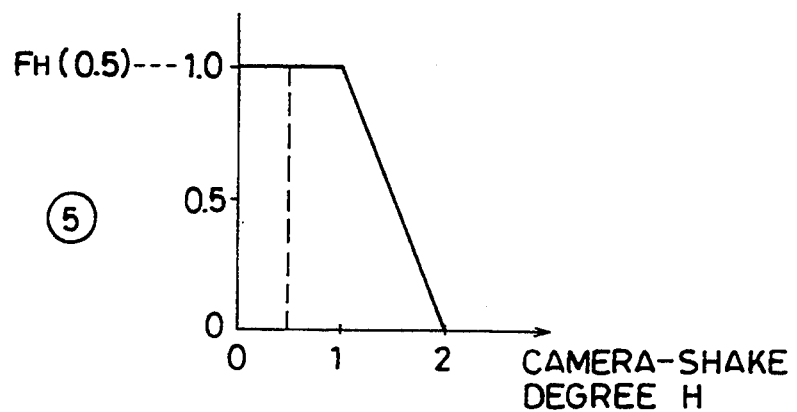

FIG. 8 is a schematic diagram of an inference block.

First, reliability of the AF operation inference is estimated in a reliability inference block 10 based on information from the brightness measuring circuit LMA and the focus detection light receiving circuit AFD, and information such as the measured focus detection reliability value YM/C, the photographing magnification $\beta$, the object brightness B, variation in speed, a camera-shake amount etc. The reason for determining the magnification is that if the magnification is high, the values of focus detections considerably vary to cause a large error in detection. Such variation depends mainly on the camera holding conditions of the photographer. Therefore, a determined magnification level is learned and stored in the E²PROM for each photographer based on variation of measured focus detection values during moving object determination continued for a still object to be described afterwards, and magnification information at the time of the determination. The photographing magnification is obtained from the focal length f of the lens and the distance to the object.

If the reliability value A of the AF operation inference is very low, this means that it is not possible to infer AF operation. In that case, the lens drive is temporarily stopped at an in-focus point, whereby it is possible to avoid an abnormal deviation of focus due to unstable lens operation or excessive correction for the moving object.

A moving object detection inference block 20 is provided based on the reliability evaluation value A, divisional brightness measurement for detecting whether the object is a moving object or camera-shake occurs, and a change amount of information obtained by focus detection. The moving object detection inference block 20 is a block for inferring how the present object is suited for the respective AF operation modes including AF lock, determination continuation, continuous AF, and moving object prediction continuous AF modes.

Next, a control amount inference block 30 is a block in which the most suitable operation mode for the camera is inferred and selected among the above-mentioned four operation modes based on the results of the inference of the moving object detection inference block 20.

All those inferences are not crisp (binary) inferences but fuzzy inferences using a fuzzy set for numerical evaluation. In consequence, compared with U.S. Ser. No. 352,190 filed by the same assignee as that of the present application, it becomes easier to control a camera based on various information in a manner fitted to the human sense.

First, referring to FIGS. 9A-F, 10A and 10B, the reliability inference block will be described.

First, as to reliability of the moving object determination, the following conditions are established.

① If the object brightness is high, (the S/N ratio is improved because of increase in an output of the sensor and) the moving object determination has a high reliability.

Thus, the condition that "if the object brightness is high, then the reliability is high" is established.

② If focus detection has a high reliability, that is, if the measured focus detection reliability value YM/C is low, the moving object determination has a high reliability (because calculation of the speed of the moving object serving as a basis for the moving object determination can be made correctly).

Thus, the condition that "if the measured distance reliability value YM/C is low, then the reliability is high" is established.

③ If the photographing magnification is low, the moving object determination has a high reliability (because camera-shake does not affect the measured focus detection values).

Thus, the condition that "if the magnification $\beta$ is small, then the reliability is high" is established.

④ If there is little variation in the object speed represented on the film surface, the moving object determination has a high reliability.

Thus, the condition that "if there is little variation in the object speed, then the reliability is high" is established.

⑤ If a degree of camera-shake is small, the moving object determination has a high reliability (because the camera-shake does not affect the measured focus detection values).

Thus, the condition that "if the degree of camera-shake is small, then the reliability is high "is established.

The above-mentioned degree of camera-shake is a degree obtained by extracting an output of a camera-shake frequency range (for example 1 Hz to 12 Hz) from the output of the camera-shake detecting circuit DVP and normalizing, by using a prescribed permissible camera-shake amount $K_H$, a value obtained by multiplying the maximum value Hmax of the amplitude of the extracted output by the focal length f of the taking lens.

Thus, camera-shake degree $H = Hmax \times f/K_H$

Then, the reliability evaluation value A is obtained by approximate collating of the above-mentioned inferences ①  to ⑤ (i.e., fuzzy production rules) with processed information from the respective sensors.

All the inferences ① to ⑤ have the following relation with the reliability evaluation value A.

"If (the brightness is high) AND (the measured distance reliability is high) AND (the magnification is low) AND (a stable speed of the moving object is obtained) AND (the degree of camera-shake is small), then the reliability (A) of the moving object determination is high."

FIGS. 9A–9F shows membership functions (① to ④, ④', ⑤) representing collating degrees with respect to the condition parts (if-) of the respective inferences used for the approximate collation.

Each membership function is represented as a curve which determines the reliability A by the corresponding single factor with other factors being assumed at the complete reliability level A=1.

For example, with regard to the measured distance reliability (in the inference ②), it is very high if the measured distance reliability value YM/C is smaller than 0.1 and this factor exerts no effect on the reliability of the whole system. Conversely, if the above-mentioned measured distance reliability value is larger than 0.6, good reliability is not ensured for the whole system. Consequently, the reliability of the system changes in relation to those values.

Thus, the membership functions are set in the respective inferences. As for the magnification β, the membership function is defined to effect tuning in a manner in which predetermined broken lines of inclination are shifted based on the value $\beta_{E2PROM}$ written in the E²-PROM to start inclining downward from 1 in the range of the value $\beta_{E2PROM}$. Thus, the inference is made by taking account of differences in camera-shake degrees on the side of photographers. As to the variation in the object speed, the absolute value of the variation tends to increase as the speed increases. Accordingly, if the average speed is less than a prescribed value SPth, the membership function for evaluating reliability by the absolute value of the variation (in the inference ④) is defined. If the average speed is equal to or larger than the prescribed value, the membership function for evaluating the reliability by a ratio with the average speed (in the inference ④') is defined.

Evaluation values $F_B(B)$, $F_{YM/C}$ (YM/C), $F_\beta$ (β), $F_{SP}$ (SP), and $F_H(H)$ with respect to inputs for those membership functions are obtained and the minimum value is selected among those values, whereby the reliability evaluation value A of the moving object determination is obtained.

Figure 10A:
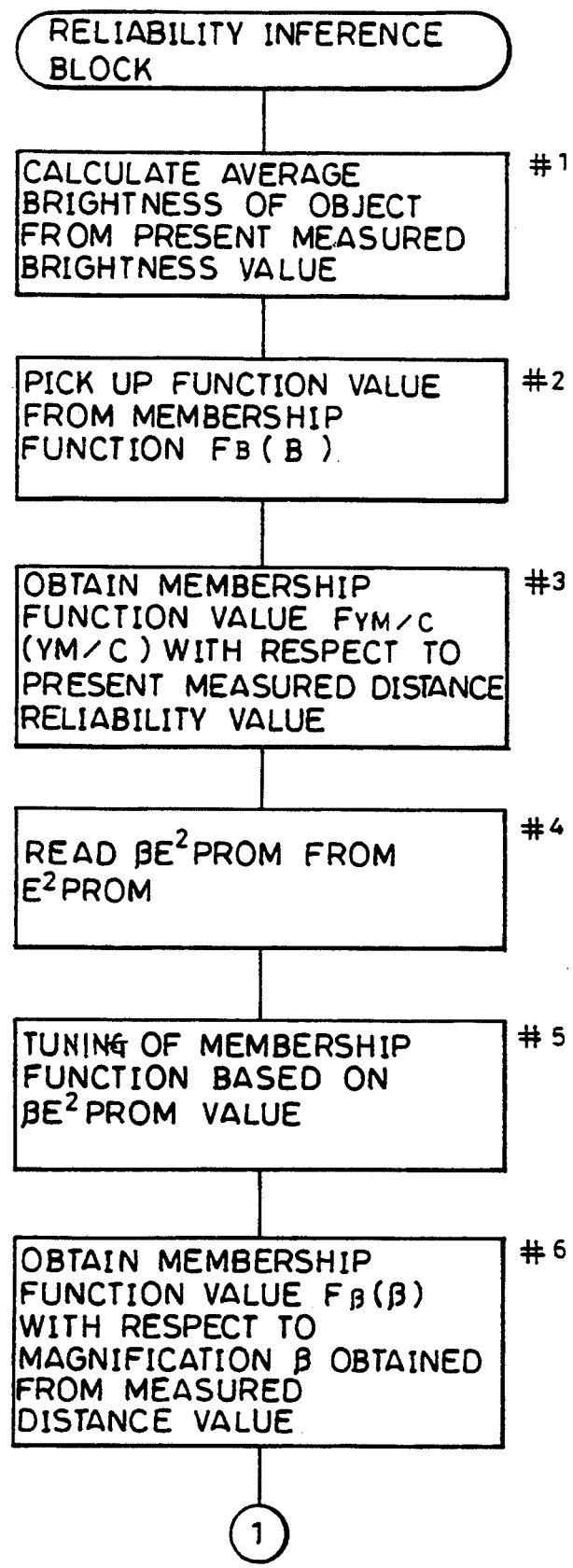
FIGS. 10A and 10B are flow charts of specific procedures of the reliability inference block in FIG. 9.
Figure 10B:
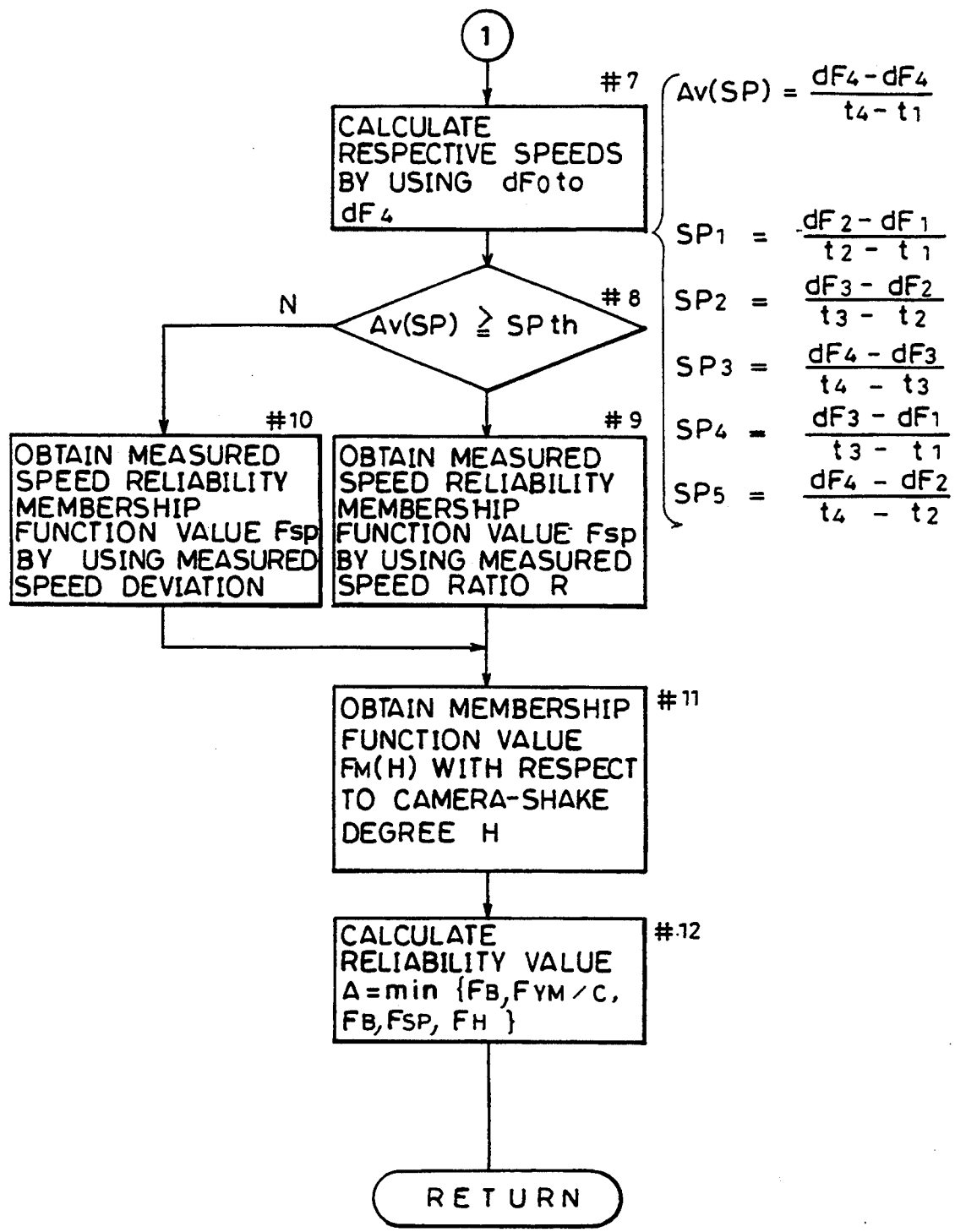

FIGS. 10A and 10B are flow charts for calculating the reliability evaluation value A.

First, in step #1, an average brightness B of the object is calculated based on the measured brightness value obtained this time. In step #2, a function value based on the brightness B calculated from the membership function $F_B(B)$ is picked up. Subsequently, in step #3, a function value is calculated from the membership function $F_{YM/C}$ (YM/C) with respect to the measured distance reliability value YM/C is calculated for the focus detection value obtained by the present measurement.

Next, the magnification $\beta_{E2PROM}$ written in the E²-PROM is read and the membership function $F_\beta(\beta)$ is tuned based on the value (in step #5). Then, the membership function value $F_\beta(\beta)$ with respect to the photographing magnification β obtained based on the measured focus detection value is calculated (in step #6).

In step #7, the object speed is calculated based on the focus amounts $dF_0$ to $dF_4$. In step #8, it is determined whether the average speed A v(SP) is larger than the prescribed value SPth. If the average speed is larger than the prescribed value, the measured speed reliability membership function value $F_{SP}$ is obtained by using a measured speed ratio R (in step #9). If the average speed is smaller than the prescribed value, the measured speed reliability membership function value $F_{SP}$ is obtained by using a deviation in the measured speed in step #10.

Subsequently, in step #11, the membership function value $F_H(H)$ with respect to the camera-shake degree H is obtained. Then, in step #12, the reliability value is calculated based on the respective membership function values obtained in the above-mentioned steps. Thus, the following value is calculated.

$$A = \min(F_B, F_{YM/C}, F_\beta, F_{SP}, F_H)$$

The reliability evaluation value A thus obtained is $0 \leq A \leq 1$. In the case of A=0, the moving object determination is apparently unavailable and AF lock is effected (in step #542 in FIG. 5). Thus, only in the case of A≠0, the program proceeds to the moving object detection inference block.

FIG. 11 is a diagram showing a pattern of division into the moving object detection inference block and the control amount inference block.

In those inferences, the optimum AF operation mode for the object is determined from the object speed detected by changes in brightness of the central region of brightness measurement including the focus detection areas and changes in background brightness of the surrounding areas.

Those fuzzy production rules ① to ⑥ will be described by taking an example of a simple actual state of use.

①. If the speed of the main object is zero, the object is still picked up in the focus detection areas and this speed is very slow or the object is actually at a stop. Thus, in those cases, it is desirable to continue the moving object determination (JC).

②. If the speed of the main object is negative (that is, the main object becomes distant from the camera) and the brightness changes in the central or peripheral region, there is a strong possibility that framing is changed (that is, AF lock is set) of the photographer's own will after end of AF operation in the central focus detection area. Therefore, in that case, it is desirable to set focus lock (FL), not following subsequent measured focus detection values.

③. If the speed of the object is not zero and the brightness in the central and peripheral regions changes considerably, there is a strong possibility that the photographer intentionally moves the camera to change framing. Thus, in that case, it is desirable to set focus lock (FL).

④. If the speed of the main object is positive and change in brightness in either the central region or the background is small, there is a strong possibility that the main object is a moving object in either case. More specifically stated, if the change in brightness in the central region is small, the photographer can be considered to move the camera in order to continuously pick up the main object at the center. Conversely, if the change in brightness in the background region is small, there is little camera-shake by the photographer and the effect exerted by the brightness measuring sensors on the main subject differs dependent on movement of the main object in the central area of brightness measurement including the focus detection areas. Thus, in a strong probability, the main object is a moving object. Therefore, in either case, it is desirable to set moving object prediction continuous AF (PC).

⑤. It is possible to assume a case in which the camera is not shaken and the main object becomes distant at a considerably fast speed if change in brightness in either the central region or the background is small and the speed of the main object is a large negative value. In that case, it is desirable to set the moving object prediction continuous AF (PC).

⑥. If change in brightness in either the central region or the background is small and the speed of the main object is a negative small value, a case can be similarly assumed in which the camera is not shaken and the main object becomes distant. If the main object approaches, the speed c,n the film surface increases rapidly. Conversely, if it becomes distant, it is normally difficult to assume a photographing situation in which the speed on the film surface decreases. Therefore, it is difficult to predict subsequent operation of the object and it is desirable to set the previously stated continuous AF(C) and to enable the camera to be ready for complicated operation.

Based on the above-described six fuzzy production rules, the AF operation mode is determined.

FIGS. 12A-F represent diagrams showing inference processes in the above-described cases.

Before explanation of the inference processes, description will be made of calculation of changes in brightness in the central and peripheral regions with reference to FIG. 15.

Let us assume that measured values of the brightness measuring devices $PD_1$ to $PD_6$ by brightness measurement at multiple points are calculated as shown. Referring to FIG. 15, the marks o represent previously measured brightness values and the marks □ represent presently measured brightness values. The change values in the central and peripheral regions are change amounts normalized by measured brightness distribution widths.

First, the maximum and minimum values are extracted among 12 pieces of measured brightness information obtained by the above-mentioned two brightness measurements. Then, a difference between the previously measured brightness value and the presently measured brightness value in each brightness measuring device PD is obtained and the values normalized by the maximum and minimum differences are obtained as change amounts $\Delta Bn$ (n=1 to 6) in the respective brightness measuring devices. Among the values of the central brightness measuring area, n=1 to 3, the maximum change amount is regarded as the central brightness change, and the maximum change amount among the values in the peripheral brightness measuring region, n=4 to 6 is regarded as the peripheral brightness change.

However, if the brightness distribution width is very small, there is a considerable brightness change due to noise. Consequently, if the brightness distribution width is smaller than a prescribed value, the state is set to a central brightness change 1 and a peripheral brightness change 0 which serve as determination information based on the measured focus detection values.

Next, referring to FIGS. 12A-12F, the moving object detection inference block and the control amount inference block will be described.

Figures 12A, 12B:
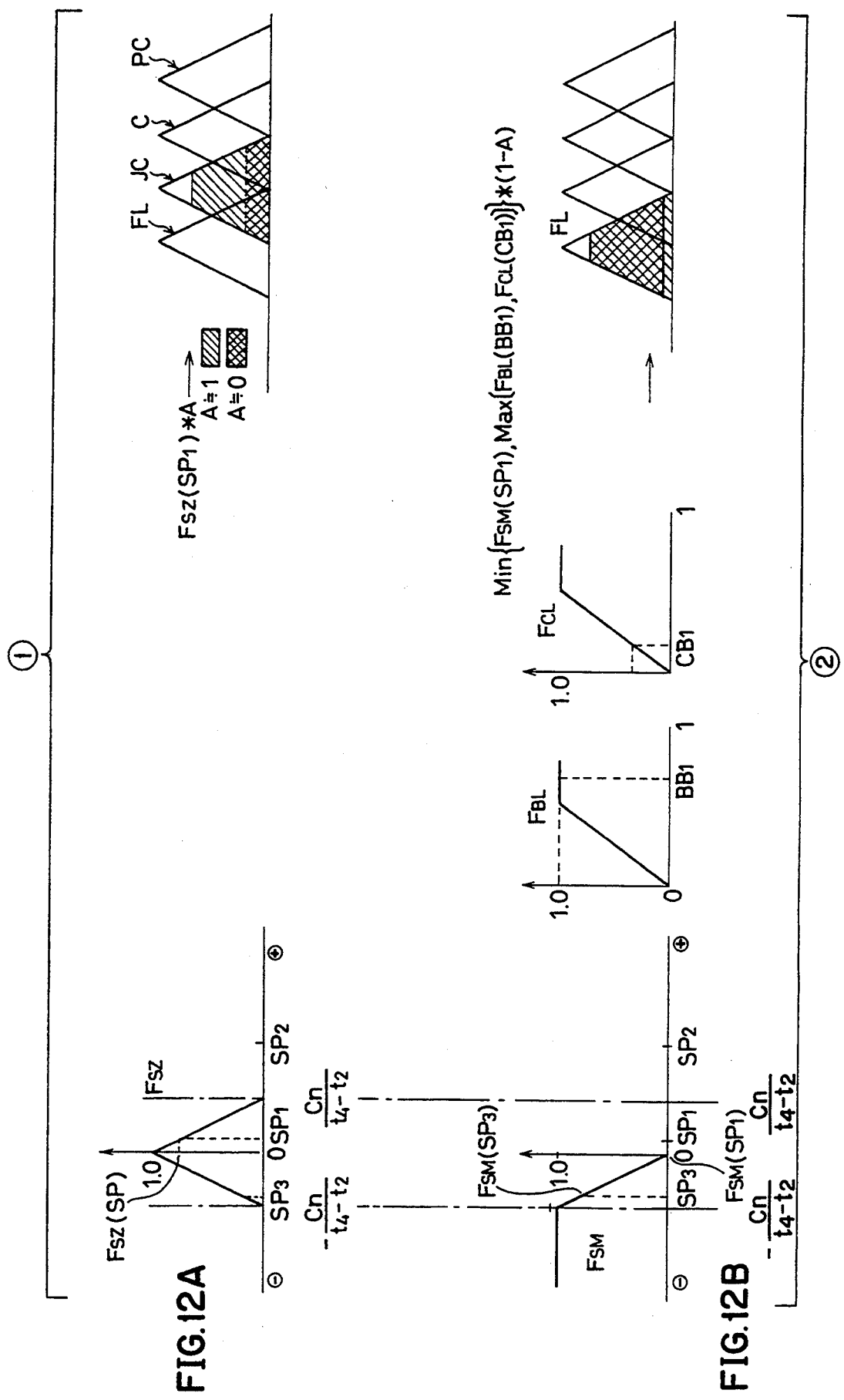
FIGS. 12A-12F represent diagrams showing inference processes in the inference block according to the embodiment of the invention.

First, in the inference ① shown in FIG. 12A, it is inferred whether the detected speed of the object is approximate to zero or not. Subsequently, the membership functions of the speed are all determined based on a deviation Cn given by the focal length f. A function value of the membership function Fsz (SP) of ① of FIG. 12A with respect to the obtained average speed is calculated. A value obtained by multiplication by the reliability evaluation value A is used as the approximate collating value of this inference ①, that is, Fsz (SP)×A.

Next, in the inference ② shown in FIG. 12B, it is inferred whether the object speed is applied in the minus direction or not. A function value of the membership function $F_{SM}$(SP) of ② of FIG. 12B with respect to the obtained average speed is calculated. As to the brightness change, the function value $F_{BL}$ ($BB_1$) corresponding to the background brightness change amount $BB_1$, and the function value $F_{CL}$ ($CB_1$) corresponding to the central brightness change amount $CB_1$ are calculated by using the membership function indicating whether there is a significant brightness change in the background and central regions.

Since the inference ② is based on the condition that "if the main object speed is - and a large brightness change occurs in the either background or the central region, then focus lock is set", a value obtained by multiplying the value of Min $\{F_{SM}(SP_1), Max\{F_{BL}(BB_1), F_{CL}(CB_1)\}\}$ by a complement (1−A) of 1 (non-reliability evaluation value) for the reliability evaluation value A is regarded as the approximate collating value of this inference ②. Thus, the approximate collating value is as follows.

Min$\{F_{SM}(SP_1)$, Max$\{F_{BL}(BB_1)$, $F_{CL}(CB_1)\}\} \times (1-A)$

Figure 12C:
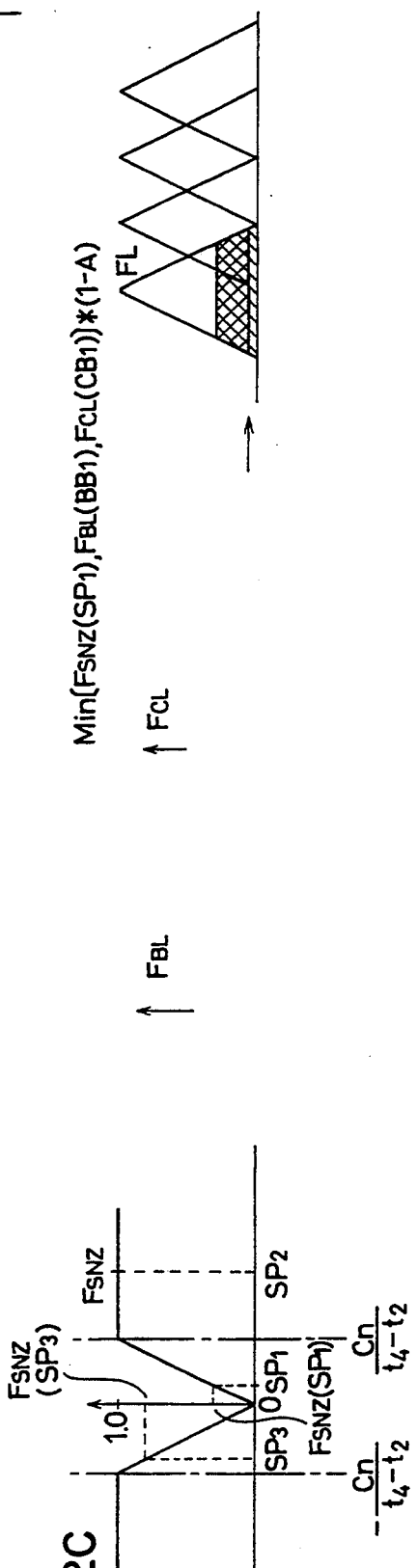

Next, in the inference ③ shown in FIG. 12C, it is inferred whether the main object speed is "NOT Zero".

A function value of the membership function $F_{SNZ}$ (SP) of ③ of FIG. 12C with respect to the obtained average speed is calculated and, in the same manner as in the inference ②, $F_{BL}(BB_1)$ and $F_{CL}(CB_1)$ are calculated by using the membership function indicating whether a large brightness change occurs in the background and central regions. Since the inference ③ is based on the condition that "if the main object speed is not zero and a large brightness change occurs in both the background and central regions, then focus lock is set", a value obtained by multiplying Min$\{Fsnz(SP_1), F_{BL} (BB_1), F_{CL}(CB_1)\}$ by a complement of (1−A) of 1 of the reliability evaluation value A is used as the approximate collating value of the inference ③.

Thus, the approximate collating value is as follows.

Min$\{F_{SNZ}(SP_1), F_{BL}(BB_1), F_{CL}(CB_1)\} \times (1-A)$

Figure 12D:
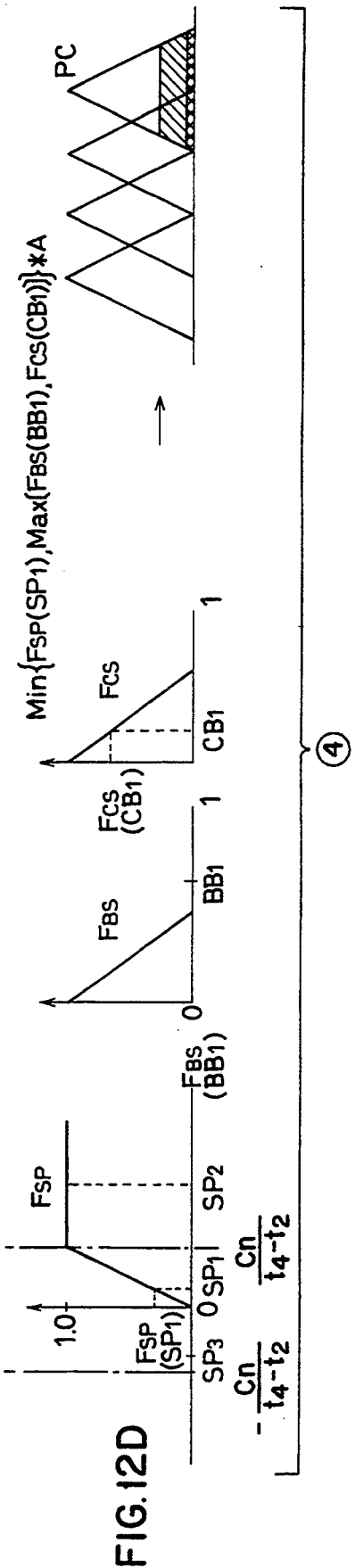

Next, in the inference ④ shown in FIG. 12D, it is inferred whether the main object speed is a plus value or not.

A function value of the membership function $F_{SP}$ (SP) of 4 of FIG. 12D with respect to the obtained average speed is calculated and a function value $F_{BS}$ ($BB_1$) corresponding to the background brightness change amount $BB_1$, and a function value $F_{CS}$ ($CB_1$)

corresponding to the central brightness change amount $CB_1$ are calculated by using the membership function indicating whether a small brightness change occurs in the background and central regions.

Since the inference ④ is based on the condition that "if the main object speed is + and the brightness change is small in either the background or the central region, then the moving object prediction continuous Af is set", a value obtained by multiplying Min{$F_{SP}$ ($SP_1$), Max{$F_{BS}$ ($BB_1$), $F_{CS}$ ($CB_1$)}} by the reliability evaluation value A is used as the approximate collating value of the inference ④. Thus, the inference collating value is as follows.

Min{$F_{SP}$($SP_1$), Max{$F_{BS}$($BB_1$), $F_{CS}$($CB_1$)}}×A

Figure 12E:
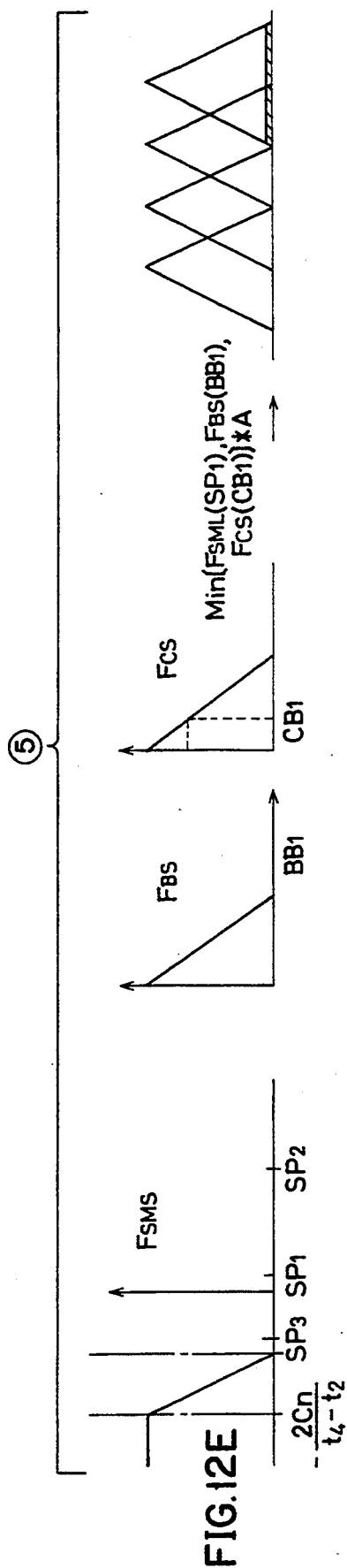

In the inference ⑤ shown in FIG. 12E, it is inferred whether the main object speed is a large minus value or not.

A function value of the membership function $F_{SML}$ (SP) of ⑤ in FIG. 12E with respect to the obtained average speed is calculated and the function value $F_{BS}$ ($BB_1$) corresponding to the background brightness change $BB_1$, and the function value $F_{CS}$ ($CB_1$) corresponding to the central brightness change amount $CB_1$ are calculated by using the membership functions indicating whether the brightness change in the background and central regions is small or not.

Since the inference ⑤ is based on the condition that "if the main object speed is a large minus value and the brightness change in both the background and central regions is small, then the moving object prediction continuous AF is set", a value obtained by multiplying Min {$F_{SML}$($SP_1$), $F_{BS}$ ($BB_1$), $F_{CS}$ ($CB_1$)} by the reliability evaluation value A is used as the approximate collating value of the inference ⑤.

Thus, the approximate collating value is as follows.

Min{$F_{SML}$($SP_1$), $F_{BS}$($BB_1$), $F_{CS}$($CB_1$)}×A

Figure 12F:
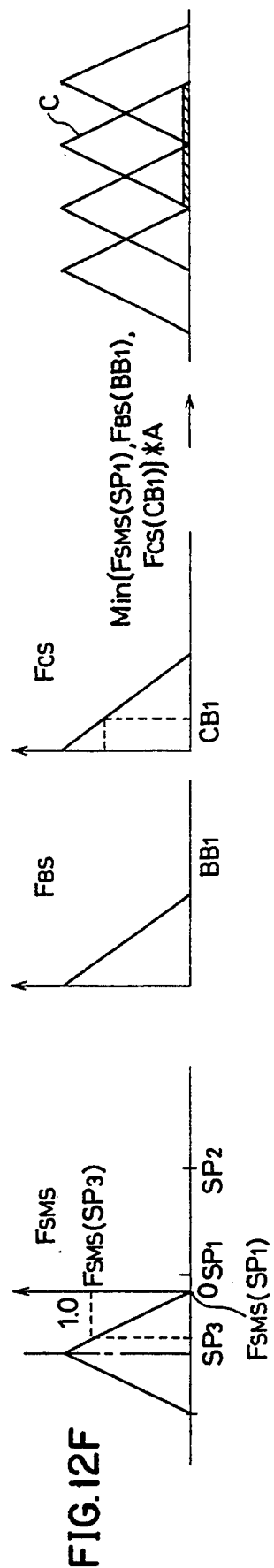

Next, in the inference ⑥ shown in FIG. 12F, it is inferred whether the main object speed is a minus small value or not.

A function value of the membership function $F_{SML}$ (SP) of 6 of FIG. 12F with respect to the obtained average speed is calculated and the function value $F_{BS}$ ($BB_1$) corresponding to the background brightness change BB1, and the function value $F_{CS}$ ($CB_1$) corresponding to the central brightness change amount $CB_1$ are calculated by using the membership functions indicating whether the brightness change in the background and central regions is small or not.

Since the inference ⑥ is based on the condition that "if the main object speed is a minus small value and the brightness change in both the background and central regions is small, then continuous AF is set", a value obtained by multiplying Min {$F_{SMS}$ ($SP_1$), $F_{BS}$ ($BB_1$), $F_{CS}$($CB_1$)} by the reliability evaluation value A is used as the approximate collating value of the inference ⑥.

Thus, the approximate collating value is as follows.

Min{$F_{SMS}$($SP_1$), $F_{BS}$($BB_1$), $F_{CS}$($CB_1$)}×A

Figure 13A:
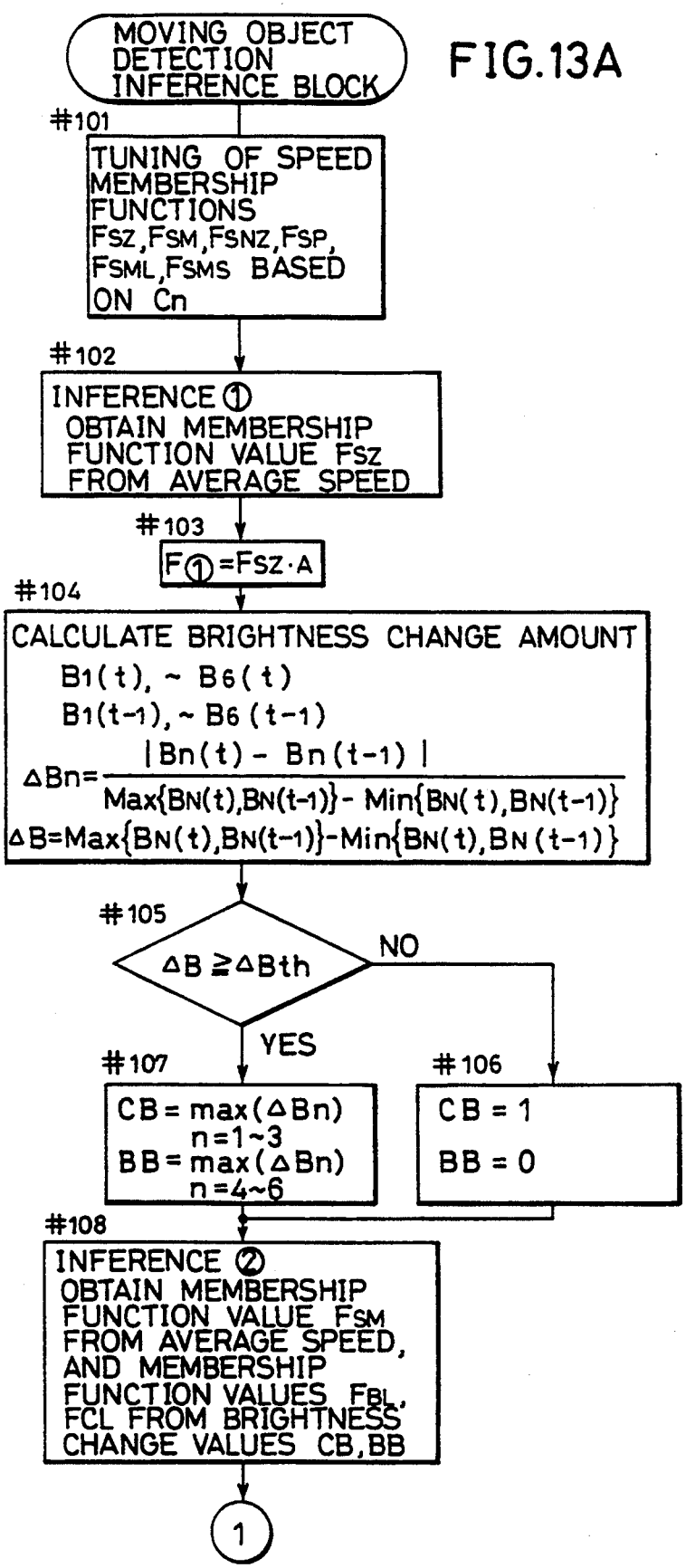

FIGS. 13A and 13B are flow charts showing the above-described moving object detection inference block.

Referring to those figures, first, in step #101, the speed membership functions $F_{SZ}$, $F_{SM}$, $S_{SNZ}$, $F_{SP}$, $F_{SML}$, and $F_{SMS}$ are obtained based on the defocus determination level Cn defined with respect to the focal length f of the lens.

Next, in step #102, the inference ① is made. In this case, the membership function value Fsz is obtained from the average speed and this value $F_{SZ}$ is multiplied by the reliability evaluation value A in step #103 to obtain the approximate collating value F① of the inference ①.

In step #104, the brightness change amount is calculated. In this case, $B_1(t)$ to $B_6(t)$ are outputs of the six brightness measuring devices provided by the present measurement, and $B_1(t-1)$ to $B_6(t-1)$ are outputs of the six brightness measuring devices obtained by the previous measurement.

$\Delta B_N$ represents a difference between the previous and present brightnesses in the six brightness measuring devices, and $\Delta B$ is calculated based on the brightness difference between the maximum and minimum values on the brightness information at 12 points of $B_1(t)$ to $B_6(t)$ (hereinafter referred to as $B_N(t)$) and $B_1(t-1)$ to $B_6(t-1)$ (hereinafter referred to as $B_N(t-1)$). Thus, $\Delta B_N$ is normalized by $\Delta B$.

In step #105, comparison between $\Delta B$ and the prescribed value $\Delta Bth$ is made. If the brightness distribution width is very small, the value of $\Delta B_N$ considerably changes due to noise and in that case determination information based on the maximum measured focus detection value is used. The central brightness change is set to CB=1 and the peripheral brightness change is set to BB=0 (in step #106). If there is some brightness difference in the brightness distribution, the central brightness change amount is obtained as $$CB = \max\{\Delta Bn\}, \quad n = 1\text{-}3$$

and the peripheral brightness change amount is obtained as $$BB = \max(\Delta Bn) \quad n = 4\text{-}6$$

in step #107. In step #108, the inference ② is made by using the calculated brightness change values CB and BB and the average speed. The membership function value $F_{SM}$ is obtained from the average speed, and the membership function values $F_{BL}$ and $F_{CL}$ are obtained from the brightness change values CB and BB. In step #109, the approximate collating value F② of the inference ② is obtained.

In step #110, the inference ③ is made. The membership function value $F_{SNZ}$ is obtained from the average speed and the approximate collating value F③ of the inference ③ is obtained in step #111 by using the values $F_{BL}$, $F_{CL}$ obtained in step #108.

In step #112, the inference ④ is made. The membership function value $F_{SP}$ is obtained from the average speed, and the membership function values $F_{CS}$ and $F_{BS}$ are obtained from the brightness change values CB and BB, whereby the approximate collating value F④ of the inference ④ is obtained in step #113.

In step #114, the inference ⑤ is made. The membership function value $F_{SML}$ is obtained from the average speed and the approximate collating value F④ of the inference ⑤ is obtained in step 115 by using the values $F_{CS}$ and $F_{BS}$ obtained in step #112.

In step #116, the inference ⑥ is made. The membership function value $F_{SMS}$ is obtained from the average speed and the approximate collating value F⑥ of the inference ⑥ is obtained in step #117 by using the values $F_{CS}$ and $F_{BS}$ obtained in step #112.

Thus, the respective approximate collating values F① to F⑥ corresponding to the inferences ① to ⑥ are obtained. Those inferences may be effected in parallel.

FIG. 16 is a structural diagram of parallel processing of the inferences ① to ⑥ shown in FIG. 13.

Since the inferences ① to ⑥ can be independently effected, it is possible to effect those inferences in parallel. The reliability evaluation value A of the reliability inference block 10, the average speed and the brightness change amounts CB, BB associated with the respective inferences are set as input data on the data bus and an inference start signal is applied, whereby each of inference portions 22a to 22f makes the prescribed inference. The results of the inferences are supplied as the approximate collating values F(n) of the inferences to the control amount inference block 30 and, at the same time, a signal ENDF(n) indicating the termination of the inferences is supplied from each inference block to an AND circuit 24. The AND circuit 24 applies a start signal to the control amount inference block 30 on termination of all the inferences and after that the control amount inference block 30 operates. Thus, it is possible to reduce the calculation time by the parallel processing of the inferences.

Figure 14A:
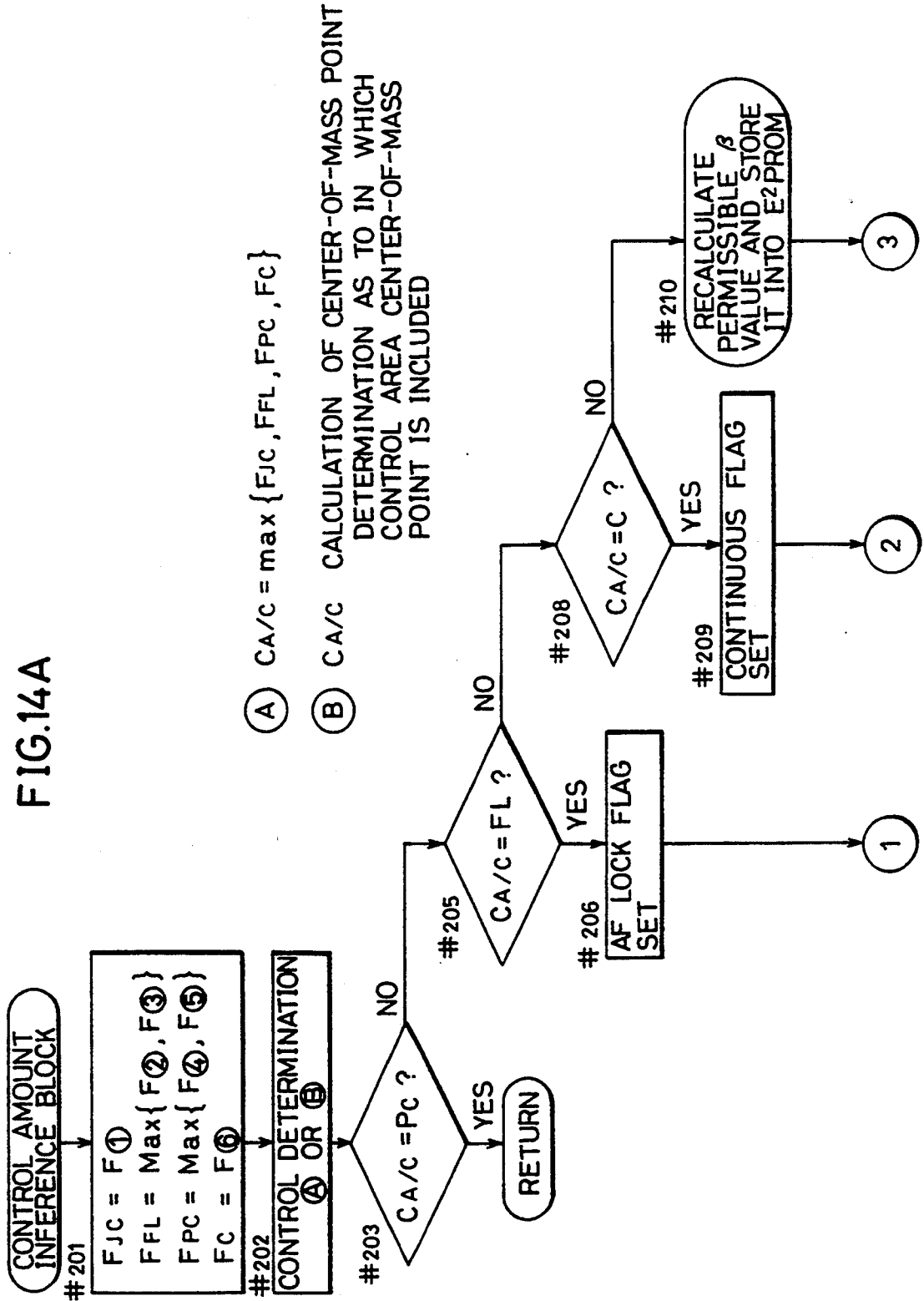
FIGS. 14A and 14B are flow charts showing specific procedures of the control amount inference block in FIG. 8.
Figure 14B:
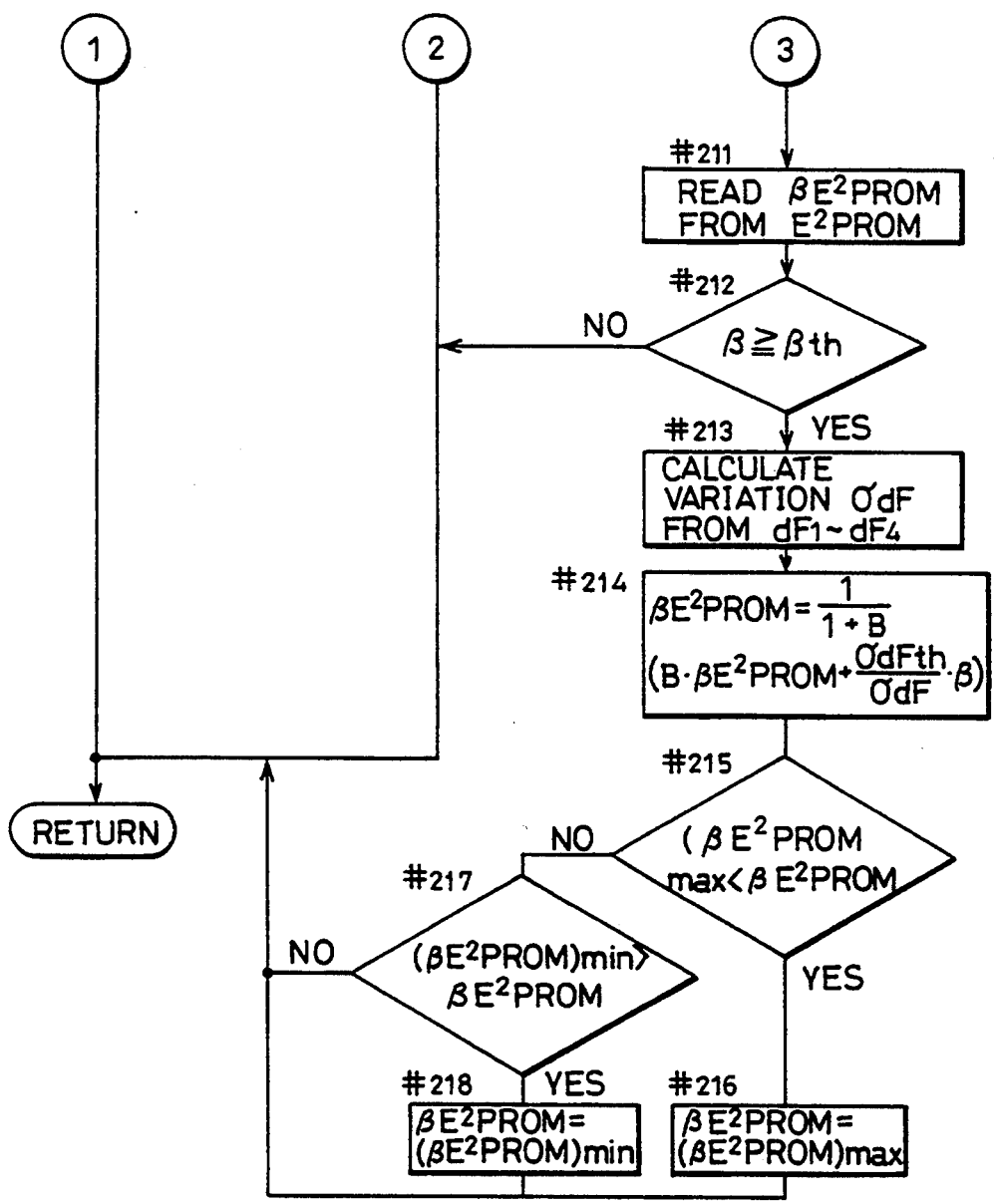

FIGS. 14A and 14B are flow charts showing a processing flow of the control amount inference block.

First, in step #201, the approximate collating values F① to F⑥ of the respective inferences calculated in the moving object detection inference block are set in correspondence with the AF operation mode.

In this step, $F_{JC}$ is an evaluation value showing continuation of the moving object determination; $F_{FL}$ is an evaluation value showing focus lock; $F_{PC}$ is an evaluation value showing moving object prediction continuous AF; and $F_C$ is an evaluation value showing continuous AF. They are calculated by the following equations.

$$F_{JC} = F①$$

$$F_{FL} = \text{Max}\{F②, F③\}$$

$$F_{PC} = \text{Max}\{F④, F⑤\}$$

$$F_C = F⑥$$

Next, in step #202, the AF operation mode $C_{A/C}$ is determined based on the evaluation values $F_{JC}$, $F_{FL}$, $F_{PC}$ and $F_C$ obtained in step #201. The determination method includes a method A and a method B and either method may be used.

In the method A, a mode having the largest evaluation value among the evaluation values $F_{JC}$, $F_{FL}$, $F_{PC}$ and $F_C$ is selected. Thus, the mode $C_{A/C}$ is represented as follows:

$$C_{A/C} = \text{Max}\{F_{JC}, F_{FL}, F_{PC}, F_C\}$$

In the method ⑧, the mode $C_{A/C}$ is determined dependent on in which control area the center-of-mass point of each of the evaluation values $F_{FL}$, $F_{JC}$, $F_C$ and $F_{PC}$ is included. Those methods A and B will be described afterwards with reference to FIG. 17.

Next, in step #203, it is determined whether moving object prediction continuous AF is selected as the AF operation mode. If the moving object prediction continuous AF is selected, the program returns immediately.

If the moving object prediction continuous AF is not selected, it is determined in step #205 whether focus lock is selected or not. If the focus lock is selected, the AF lock flag is set in step #206 and the program returns. If the focus lock is not selected, it is determined in step #208 whether continuous AF is selected or not. If the continuous AF is selected, the continuous flag is set in step #209, and the program returns. If continuous AF is not selected, the program proceeds to a routine of "recalculation of the permissible β value and storage thereof into E²PROM" in step #210. In this routine, first in step #211, the photographing magnification $\beta_{E2PROM}$ stored in the E²PROM is read. In step #212, the present photographing magnification β is compared with the prescribed value βth. This is because if the photographing magnification β is a large value, a special case such as micro-photographing is assumed and a considerable adverse effect would be exerted by rewriting the stored magnification $\beta_{E2PROM}$. More specifically, if the stored magnification is rewritten, the value $\beta_{E2PROM}$ would increase and the moving object mode would be liable to be selected. Therefore, if the photographing magnification β is larger than the prescribed value βth, the program immediately returns. If the magnification β is less than the prescribed value βth, a varying range $\sigma_{Df}$ of the present Df amount is obtained from $Df_1$ to $Df_4$ in step #213. This value $\sigma_{Df}$ showing the varying range is used as a weighing coefficient of the present magnification β.

In step #214, the stored magnification value $\beta_{E2PROM}$ newly is set. As to the presently detected value β, a reciprocal of a value $\sigma_{dF}/\sigma_{dFth}$ obtained by normalizing $\sigma_{dF}$ by a prescribed value $\sigma_{dFth}$ is used as a weight, and a weighted mean is obtained by weighing the previously stored magnification value $\beta_{E2PROM}$ by the prescribed value B, whereby the magnification value $\beta_{E2PROM}$ to be stored is newly set.

In step #215, the newly set value $\beta_{E2PROM}$ is compared with the maximum permissible value $(\beta_{E2PROM})$ max of $\beta_{E2PROM}$. If the value $\beta_{E2PROM}$ is larger than the maximum permissible value, the value $\beta_{E2PROM}$ is replaced by $(\beta_{E2PROM})$ max in step #216, whereby the program returns in step #207.

If it is determined in step #215 that the value $\beta_{E2PROM}$ is smaller than the permissible maximum value, it is compared with the permissible minimum value $(\beta_{E2PROM})$ min in step #217. If the value $\beta_{E2PROM}$ is smaller than the permissible minimum value, the value $\beta_{E2PROM}$ is replaced by $(\beta_{E2PROM})$ min in step #218 and the program returns. If the value $\beta_{E2PROM}$ is larger than the permissible minimum value, the program immediately returns.

On the other hand, if the value $\beta_{E2PROM}$ is larger than the permissible maximum value, the value $\beta_{E2PROM}$ is replaced by the value $(\beta_{E2PROM})$ max in step #216 and the program returns.

FIGS. 17A–17D represents diagrams showing procedures for specifically determining the AF control mode.

In this case, for example, with the conditions of the object speed of SP1, the central brightness change amount of $CB_1$, the background brightness change amount of $BB_1$ and the reliability determination value of A=1, the respective evaluation inference values are obtained as shown in ① of FIG. 17A.

More specifically, a JC mode in which determination continues is selected as the AF control mode by $MP_1$ according to a Max method as the method A in FIG. 14, or $WP_1$ according to a weighing method as the method B.

If the reliability determination value in the above-mentioned conditions is changed to A=0, an FL mode, that is, the focus lock mode is selected as shown in ② FIG. 17B. Similarly, if the object speed in the above-mentioned conditions is changed to SP2 and the reliability determination value is A=1, a PC mode, that is, the moving object prediction continuous AF mode is selected as shown in ③ FIG. 17C. If the object speed is SP3 and the reliability determination value is A=1, the focus lock mode is selected as shown in ④ FIG. 17D.

In the above-described embodiment, automatic switching of the AF mode is accomplished by the fuzzy inference using multiple-point measured brightness values, measured focus detection values and the like. However, even in a conventional control method by binary determination not using the fuzzy inference, automatic switching of the AF mode can be accomplished by using multiple-point measured brightness values and measured focus detection values.

More specifically, instead of using the classification in FIGS. 12A–12F, automatic switching of the AF mode may be effected as shown in the flow chart in FIG. 18. If the background brightness change amount BB is larger than a prescribed value $bb_1$ as a reference value for determination of background brightness change, it is determined that there is a significant background brightness change. Similarly, if the central brightness change amount CB is larger than a prescribed value CB1 as a reference value for determination of central brightness change, it is determined that the central brightness change occurs to a significant degree.

Prescribed values $A_1$ to $A_4$ for determining a minus large value, a minus small value, a plus small value, and a plus large value as to the object speed on the film surface have the relations of $A_1>A_2>0>A_3>A_4$. If the object speed SP on the film surface has the relation of $SP>A_1$, it is determined that the object speed is a plus great value.

In the above-described embodiment, automatic switching of the AF mode is accomplished by the fuzzy inference using various information including multiple-point measured brightness values. However, it is also possible to accomplish automatic switching of the AF mode simply by only multiple-point measured brightness values as shown in FIG. 19.

Figures 19, 20:
FIG. 19 is a diagram showing a relationship between brightness changes and AF modes according to the second embodiment.
FIG. 20 shows composition in a finder related with FIG. 19.

Referring to FIG. 19, in the situation No. 1, there are great brightness changes in both the background and the central region and it is considered that the photographer changed the framing by moving the camera intentionally. For example, as shown in FIG. 20, it is considered that after the main object is set at the center, the framing is changed so that the background may be positioned at the center. In such a case, there is a strong possibility that the main object is outside the focus detection areas but it is necessary to fix a focus position in the AF mode of the camera, that is, focus lock should be selected.

In the situations No.2 and No.4, the central brightness change occurs to a small degree and therefore the main object is considered to be in the central region (in the focus detection area) and it is desirable to continue the continuous operation.

In the situation No. 3, there is a great brightness change in the central region and there is a small brightness change in the background. Therefore, it is considered that the main object is out of the central region (the focus detection area) for some cause without moving the camera intentionally. Consequently, it is desirable to continue the continuous operation. This is because once focus lock is set, the AF function could not be performed. The continuous mode includes a moving object prediction correcting continuous mode. However, since switching between the normal continuous mode and the moving object prediction correcting continuous mode does not have a direct relation with the present invention, the description thereof is not made.

Figure 21:
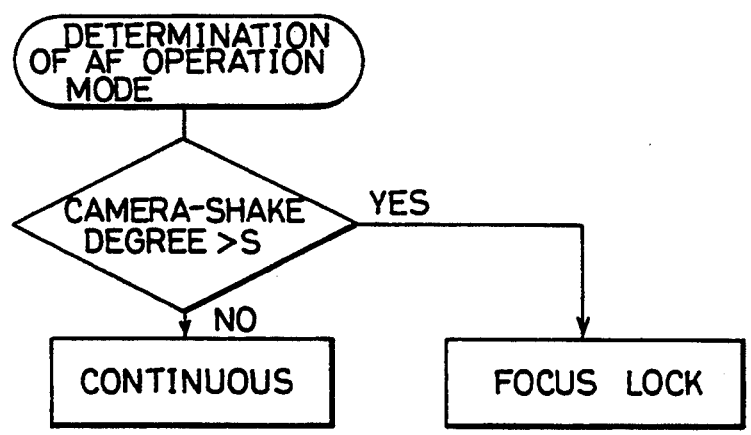
FIG. 21 is a flow chart showing procedures of determining the AF operation modes according to the second embodiment of the invention.

In addition, in the above-described embodiment, an output of the camera-shake detecting means is used for calculation of the moving object determination reliability value. However, as shown in FIG. 21, it is possible to control the operation mode to set focus lock in a simple manner when the output of the camera-shake detecting means is a large value.

In this description, the value S is a prescribed value showing a permissible camera-shake value. More specifically, if came-shake occurs to a large degree, a correct measured focus detection value enabling continuous operation could hardly be obtained and lens drive operation would be unstable. Such conditions would cause a disagreeable feeling in use of the camera and therefore it is desirable to set focus lock to avoid such conditions.

As described in the foregoing, according to the present invention, a suitable operation mode is selected based on came-shake information. Thus, it is possible to determine whether a change in framing or camera-shake occurs after AF operation and to avoid errors in measured focus detection values or the like with the maximum value of camera-shake.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A camera, comprising:
    automatic focusing means, operable in a plurality of focusing modes, for detecting a focus condition and controlling the position of an objective lens to adjust the focus condition, wherein the objective lens is driven in accordance with the detected focus condition in each of the plurality of focusing modes;
    detecting means for detecting a degree of camera-shake;
    comparing means for comparing an output of said detecting means with a prescribed reference value; and
    mode determining means for determining one of said focusing modes based on a result of the comparison performed by said comparing means.

2. The camera according to claim 1, wherein said automatic focusing means operates differently in the respective focusing modes.

3. The camera according to claim 2, wherein said plurality of focusing modes includes a first mode in which a focus adjusting operation is not carried out after an in-focus state is once realized, and a second mode in which a focus adjusting operation is repeated.

4. The camera according to claim 1, further comprising:
   determining means for determining whether or not data regarding the detected focus condition is reliable, based on a result of the comparison performed by said comparing means.

5. The camera according to claim 1, further comprising:
   first determining means for determining whether a subject to be photographed is moving or still based on data regarding the detected focus condition; and
   second determining means for determining whether or not a determination by said first determining means is reliable, based on a result of the comparison performed by said comparing means.

6. The camera according to claim 1, further comprising measuring means for measuring a brightness of an object, and wherein said mode determining means determines one of said focusing modes based on data of the measured brightness in addition to the result of said comparison.

7. The camera according to claim 1, further comprising calculating means for calculating a photographing magnification, and wherein said mode determining means determines one of said focusing modes based on data of the calculated magnification in addition to the result of said comparison.

8. The camera according to claim 1, wherein said mode determining means determines one of said focusing modes based on a fuzzy inference.

9. A camera having a plurality of operation modes, comprising:
   automatic focusing means for detecting a focus condition and controlling the position of an objective lens to adjust the focus condition;
   detecting means for detecting a degree of camera-shake;
   accumulating means for accumulating data pertaining to camera-shake as said detecting means detects camera-shake during a photographic operation by a photographer;
   comparing means for comparing the degree of camera-shake detected by said detecting means with the accumulated data pertaining to camera-shake at the time of photographing by the photographer; and
   mode setting means for setting an operation mode based on a result of comparison of said comparing means.

10. The camera according to claim 9, wherein said plurality of operation modes are focusing modes and said automatic focusing means operates differently among the plurality of focusing modes.

11. The camera according to claim 10, wherein said plurality of focusing modes includes a first mode in which a focus adjusting operation is not carried out after an in-focus state is once realized, and a second mode in which a focus adjusting operation is repeated.

12. The camera according to claim 9, further comprising:
   determining means for determining whether or not data regarding the detected focus condition is reliable, based on a result of the comparison performed by said comparing means.

13. The camera according to claim 9, further comprising:
   first determining means for determining whether a subject to be photographed is moving or still based on data regarding the detected focus condition; and
   second determining means for determining whether or not a determination by said first determining means is reliable, based on a result of the comparison performed by said comparing means.

14. A camera comprising:
   an automatic focusing means, operable in a plurality of focusing modes, for detecting a focus condition and controlling the position of an objective lens to adjust the focus condition, wherein the objective lens is driven in accordance with the detected focus condition in each of the plurality of focusing modes;
   detecting means for detecting a degree of camera-shake; and
   mode determining means for determining one of said focusing modes based on the degree of camera-shake detected by said detecting means.

15. The camera according to claim 14, wherein said plurality of focusing modes includes a first mode in which a focus adjusting operation is not carried out after an in-focus state is once realized, and a second mode in which a focus adjusting operation is repeated.

16. The camera according to claim 14, further comprising:
   determining means for determining whether or not data regarding the detected focus condition is reliable, based on the degree of camera-shake detected by said detecting means.

17. The camera according to claim 14, further comprising:
   first determining means for determining whether an object to be photographed is moving or still based on data regarding the detected focus condition; and
   second determining means for determining whether or not a determination by said first determining means is reliable, based on the degree of camera-shake detected by said detecting means.

18. The camera according to claim 14, further comprising measuring means for measuring a brightness of an object, and wherein said mode determining means determines one of said focusing modes based on data of the measured brightness in addition to the degree of camera-shake.

19. The camera according to claim 14, further comprising calculating means for calculating a photographing magnification, and wherein said mode determining means determines one of said focusing modes based on data of the calculated magnification in addition to the degree of camera-shake.

20. The camera according to claim 14, wherein said mode determining means determines one of said focusing modes based on a fuzzy inference.

* * * * *

UNITED STATES PATENT AND TRADEMARK OFFICE
CERTIFICATE OF CORRECTION

PATENT NO. : 5,379,088

DATED : January 3, 1995

INVENTOR(S) : Hiroshi UEDA et al

It is certified that error appears in the above-indentified patent and that said Letters Patent is hereby corrected as shown below:

On the title page in Section [30], kindly delete "1-310341" and insert -- 1-301341 --.

Signed and Sealed this

Twenty-eight Day of February, 1995

Attest:

BRUCE LEHMAN

Attesting Officer     *Commissioner of Patents and Trademarks*

UNITED STATES PATENT AND TRADEMARK OFFICE
CERTIFICATE OF CORRECTION

PATENT NO. : 5,379,088
DATED : January 3, 1995
INVENTOR(S) : Hiroshi UEDA et al

It is certified that error appears in the above-indentified patent and that said Letters Patent is hereby corrected as shown below:

On the title page in Section [30], kindly delete "3-301340" and insert -- 1-301340 --.

Signed and Sealed this

Fifteenth Day of August, 1995

Attest:

BRUCE LEHMAN

*Attesting Officer*     *Commissioner of Patents and Trademarks*